United States Patent
Vaziri

(10) Patent No.: US 11,988,603 B2
(45) Date of Patent: May 21, 2024

(54) HIGH SPEED DEEP TISSUE IMAGING SYSTEM USING MULTIPLEXED SCANNED TEMPORAL FOCUSING

(71) Applicant: UNIVERSITY OF VIENNA, Vienna (AT)

(72) Inventor: Alipasha Vaziri, New York, NY (US)

(73) Assignee: UNIVERSITY OF VIENNA, Vienna (AT)

( * ) Notice: Subject to any disclaimer, the term of this patent is extended or adjusted under 35 U.S.C. 154(b) by 372 days.

(21) Appl. No.: 16/346,339

(22) PCT Filed: Oct. 30, 2017

(86) PCT No.: PCT/US2017/059044
§ 371 (c)(1),
(2) Date: Apr. 30, 2019

(87) PCT Pub. No.: WO2018/081711
PCT Pub. Date: May 3, 2018

(65) Prior Publication Data
US 2020/0182792 A1 Jun. 11, 2020

Related U.S. Application Data
(60) Provisional application No. 62/414,788, filed on Oct. 30, 2016.

(51) Int. Cl.
*G01N 21/64* (2006.01)
*G02B 21/00* (2006.01)
(Continued)

(52) U.S. Cl.
CPC ..... *G01N 21/6408* (2013.01); *G01N 21/6458* (2013.01); *G01N 21/6486* (2013.01);
(Continued)

(58) Field of Classification Search
CPC .......... G01N 21/6408; G01N 21/6458; G01N 21/6486; G01N 2201/105; G01N 21/4795;
(Continued)

(56) References Cited

U.S. PATENT DOCUMENTS 3,958,229 A * 5/1976 Duguay ............... G02B 6/2861
365/234
5,293,213 A * 3/1994 Klein ................. G01N 21/6408
250/458.1
(Continued)

FOREIGN PATENT DOCUMENTS

DE 69635521 T2 * 8/2006 ........... G02B 21/002

OTHER PUBLICATIONS

Cheng et al., "Simultaneous 2-photon calcium imaging at different cortical depths in vivo with spatiotemporal multiplexing." Nat Methods, Feb. 2011 (Feb. 2011). pp 1-5.

*Primary Examiner* — Mohamed K Amara
(74) *Attorney, Agent, or Firm* — NovoTechIP International PLLC

(57) ABSTRACT

A tissue imaging system includes a laser module for outputting a laser pulse, an optical delay module configured to split a laser pulse received from the laser module into a plurality of time-delayed sub-pulses, a telescope for delivering the sub-pulses from the optical delay module to a target volume and a photodetector configured to collect photons generated within the target volume in response to excitation of the target volume by the first and second sub-pulses. The system may further include a spatial multiplexing module configured to receive the temporally multiplexed laser pulse from the optical delay module and splitting the temporally multiplexed laser pulse into a plurality of sub-beams including a first sub-beam and a second sub-beam, wherein the first sub-beam and the second sub- (Continued)

beam are spatially separated with respect to a first image plane formed at a first depth within the target volume and with respect to a second image plane formed at a second depth within the target volume.

16 Claims, 14 Drawing Sheets

(51) Int. Cl.
 *G02B 21/36* (2006.01)
 *H01S 3/00* (2006.01)
(52) U.S. Cl.
 CPC ....... *G02B 21/0076* (2013.01); *G02B 21/367* (2013.01); *G01N 2201/105* (2013.01); *H01S 3/005* (2013.01)
(58) Field of Classification Search
 CPC .. G02B 21/0076; G02B 21/367; G02B 21/16; G02B 21/06; G02B 21/002; G02B 21/0032; G02B 21/0036; G02B 21/0048; G02B 21/006; G02B 21/0084; G02B 2207/114; G02B 23/2423; G02B 23/2461; G02B 23/2484; G02B 23/26; G02B 27/145; G02B 27/0905; G02B 27/283; H01S 3/005; A61B 1/00163; A61B 1/00172; A61B 5/7203; G01J 11/00; G02F 1/3526
 See application file for complete search history.

(56) References Cited

U.S. PATENT DOCUMENTS

| | | | | |
|---|---|---|---|---|
| 5,796,477 A * | 8/1998 | Teich | ................ | G01N 21/6458 356/450 |
| 6,134,003 A * | 10/2000 | Tearney | ............... | A61B 5/0066 356/497 |
| 6,208,411 B1 * | 3/2001 | Vaez-Iravani | ...... | G01N 21/9501 356/237.2 |
| 6,248,988 B1 * | 6/2001 | Krantz | ............... | G02B 21/0072 250/201.3 |
| 6,262,423 B1 * | 7/2001 | Hell | .................... | G02B 21/002 250/461.1 |
| 6,608,676 B1 * | 8/2003 | Zhao | ................. | G01N 21/9501 250/559.27 |
| 6,631,226 B1 * | 10/2003 | Schoeppe | ............ | G02B 21/002 385/33 |
| 6,640,014 B1 * | 10/2003 | Price | .................... | G02B 21/241 358/408 |
| 9,546,962 B2 * | 1/2017 | Sullivan | ............. | G02B 27/4227 |
| 10,130,511 B2 * | 11/2018 | Dantus | ............... | A61F 9/00827 |
| 11,002,601 B2 * | 5/2021 | Fujita | ........................ | G01J 3/36 |
| 2002/0044346 A1 * | 4/2002 | Nguyen | ............... | G02B 27/146 359/368 |
| 2003/0020920 A1 * | 1/2003 | Dave | .................... | G01B 9/0201 356/479 |
| 2003/0086067 A1 * | 5/2003 | Gerstner | .............. | G02B 21/367 353/30 |
| 2003/0137669 A1 * | 7/2003 | Rollins | ............. | G01N 21/4795 356/479 |
| 2003/0156323 A1 * | 8/2003 | Overbeck | ........... | G02B 21/002 359/385 |
| 2005/0078363 A1 * | 4/2005 | Gugel | ................ | G02B 21/0084 359/385 |
| 2005/0168735 A1 * | 8/2005 | Boppart | ............. | G01N 21/4795 356/301 |
| 2005/0259319 A1 * | 11/2005 | Brooker | ............. | G02B 21/0076 359/368 |
| 2006/0124874 A1 * | 6/2006 | Uto | .................... | G01N 21/9501 250/559.45 |
| 2006/0235621 A1 * | 10/2006 | Cole | ................... | G01N 21/4795 702/19 |
| 2009/0201499 A1 * | 8/2009 | Monk | ........................ | G01J 3/18 356/310 |
| 2009/0225407 A1 * | 9/2009 | Nakayama | ........... | G02B 21/082 382/280 |
| 2010/0053743 A1 | 3/2010 | Galimberti et al. | | |
| 2010/0108913 A1 * | 5/2010 | Ershov | .................... | H01S 3/225 250/492.1 |
| 2010/0110440 A1 | 5/2010 | Vaziri | | |
| 2010/0140504 A1 * | 6/2010 | Webb | ................. | G01N 21/6458 250/459.1 |
| 2011/0294139 A1 * | 12/2011 | Takeda | ............. | G01N 33/56966 435/7.1 |
| 2012/0010513 A1 * | 1/2012 | Wong | .................... | A61B 18/18 600/476 |
| 2012/0257197 A1 * | 10/2012 | Feldkhun | ........... | G01N 21/4795 356/301 |
| 2012/0271111 A1 | 10/2012 | Namiki et al. | | |
| 2014/0128743 A1 | 5/2014 | Yew et al. | | |
| 2014/0246612 A1 * | 9/2014 | Spiecker | ................... | G01J 1/42 250/578.1 |
| 2016/0238532 A1 * | 8/2016 | Freudiger | .............. | G02B 21/16 |
| 2016/0294146 A1 * | 10/2016 | Tsia | ..................... | G02B 17/006 |
| 2016/0344156 A1 * | 11/2016 | Rothberg | ............. | C12Q 1/6869 |
| 2017/0276919 A1 * | 9/2017 | Frankel | ............. | G02B 21/0048 |
| 2018/0113292 A1 * | 4/2018 | Novikau | ................ | G02B 21/006 |
| 2020/0182792 A1 * | 6/2020 | Vaziri | ................ | G01N 21/6486 |

* cited by examiner

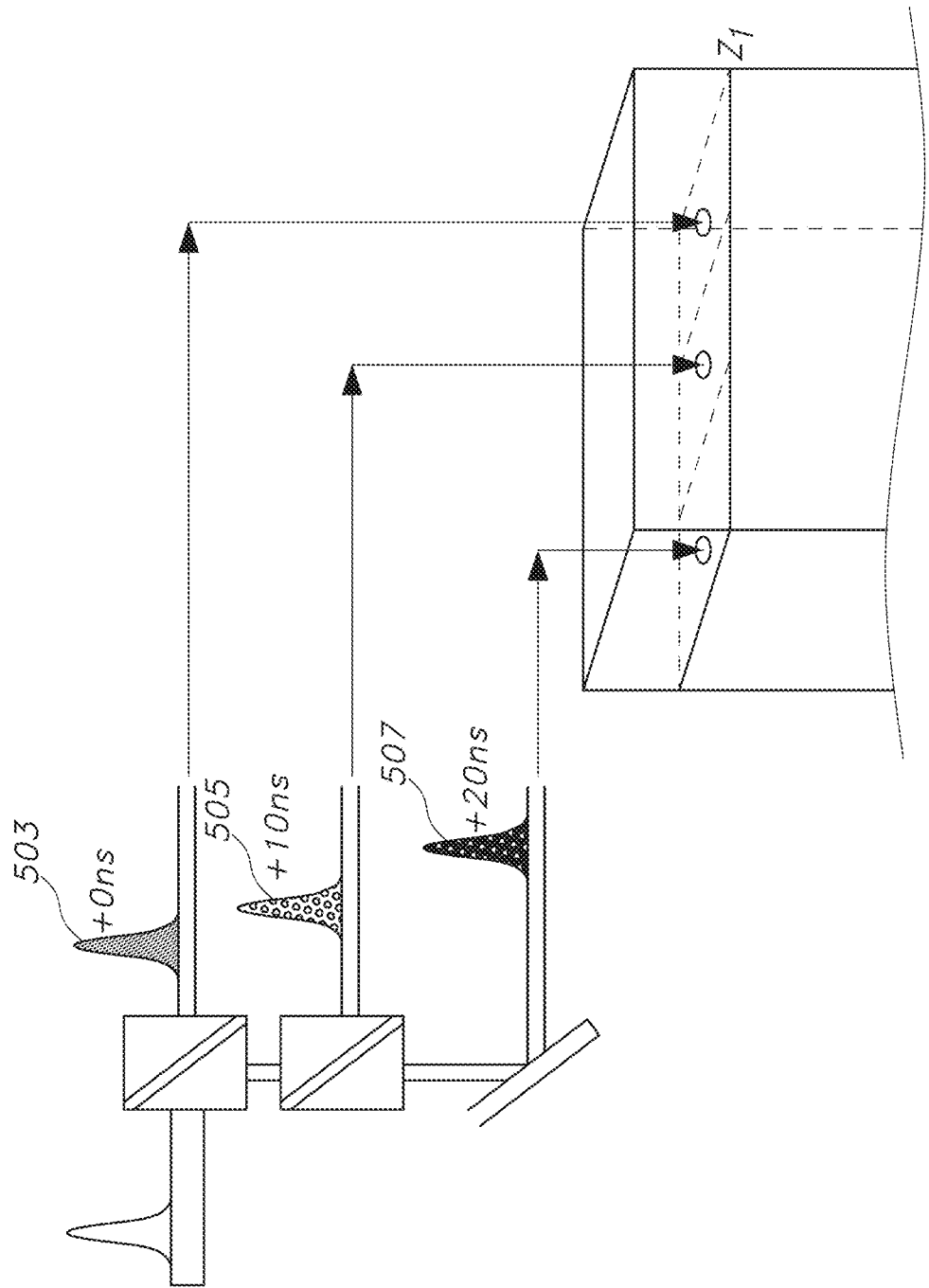

HIGH SPEED DEEP TISSUE IMAGING SYSTEM USING MULTIPLEXED SCANNED TEMPORAL FOCUSING

CROSS-REFERENCE TO RELATED APPLICATIONS

This application claims priority from U.S. provisional application Ser. No. 62/414,788, filed on Oct. 30, 2016, the specification of which is incorporated herein in its entirety for all purposes.

BACKGROUND

A major goal of modern neuroscience is to understand how neural networks perform cognitively relevant functions. In order to achieve this goal, it is useful to simultaneously and independently record activities of large neurons that are building blocks of even the simplest neural networks. This task has been hampered, however, by shortcomings in available tools and technologies.

A type of optical microscope addresses this issue by enabling near simultaneous recording of activities from tens of thousands of neurons in rodent brains, thereby enabling major leaps in understanding fundamental principles of information processing in mammalian brains, including during various health and pathological states of human brain.

The microscope uses a Multiplexed Scanned Temporal Focusing (MuST) strategy in combination with laser systems with optimized pulse characteristics. MuST is a transformative technology, bridging local microcircuits to the level of complete cortical networks. However, it has remained a challenge to perform unbiased functional imaging of large cortical volumes, for example, larger than 500 by 500 by 500 micrometer (μm), with single-cell resolution and physiological time scales (for example, faster than 5 Hz).

Neuronal network activity in the mammalian cortex supports complex brain functions, such as sensory perception, generation of motor behaviors, or memory formation. To understand the process, it is necessary to record, with high spatio-temporal resolution, from ideally all neurons within large cortical volumes comprising a functional cortical network. Over the last decade, the combination of two-photon scanning microscopy (2 PM) and genetically encoded calcium indicators (GECIs) has emerged as an indispensable tool for optical readout of neuronal activity. Variants of GECIs, such as GCaMPs are widely used for efficient and cell type-specific labeling of neurons and sensitive optical recording of changes in intracellular calcium levels, a proxy for neuronal activity. However, mechanical and optical constrains in conventional two-photon scanning microscopy have severely limited the effective volumetric field-of-view (V-FOV) and temporal resolution at which neuronal network dynamics can be captured.

Two-photon scanning microscopy features almost diffraction limited optical resolution, excellent signal to noise ratio and importantly and, in contrast to other high-speed volume imaging approaches based on one-photon excitation, improved depth penetration. These advantages, however, come at the cost that a diffraction limited excitation spot has to be scanned in the lateral plane and along the axial direction in order to capture a volumetric image, leading to low temporal resolution. The known diffraction limited two-photon scanning approaches have varying performance. For concreteness, assuming a typical 350 by 350 μm, or 512 by 512 pixel plane, standard galvanometric point-scanning with a scanning frequency of 1 kHz (kilohertz) yields a frame rate (which may also be referred to as a "temporal resolution" of the imaging system) of approximately 4 Hz (Hertz) for bidirectional scanning.

Strategies to overcome this speed limit include random access scanning using acousto-optical deflectors (AODs), a method designed for imaging with rates of up to approximately 50 kHz/N, where N is the number of points. As a second possibility, fast plane scanning using AODs or resonant scanners can significantly increase the frame rate. For example, a typical 8 kHz resonant scanner would be effective for achieving "video rate" (for example, 30 Hz) in a bidirectional scanning mode for the abovementioned 350 by 350 μm (512 by 512 pixel) image, but could only cover approximately 5 to 10 individual z-planes or about 50 μm axially per second at a 30 Hz frame rate. Even with future improvements in mechanical scanning speed, fluorescence saturation is likely to, eventually, impose limits on the overall scan speed, since such an increase in scan speed has to be accompanied by an increase in illumination intensity to maintain a useful signal-to-noise level. Although other three dimensional (3D) imaging approaches exist that do not rely on point-like two-photon laser scanning, most still fall far short of the abovementioned performance goals either by only providing a small V-FOV, not achieving cellular-level imaging resolution, or due to their susceptibility to scatter. Random access scanning approaches, which may increase frame rate by limiting scanning to targeted locations, need prior knowledge on the location of neurons and are thus difficult for application with awake animals, as neurons move frame-by-frame.

SUMMARY

A tissue imaging system according to an aspect of the present disclosure includes a laser module for outputting a laser pulse, an optical delay module configured to split a laser pulse received from the laser module into a plurality of time-delayed sub-pulses, a telescope for delivering the sub-pulses from the optical delay module to a target volume and a photodetector configured to collect photons generated within the target volume in response to excitation of the target volume by the first and second sub-pulses. The sub-pulses include a first sub-pulse and a second sub-pulse, wherein the second sub-pulse is delayed with respect to the first sub-pulse by more than 3. The first sub-pulse may be focused at a first depth within the target volume and the second sub-pulse may be focused at a second depth within the target volume, wherein the second depth is different than the first depth. Alternatively, the first and second sub-pulses can be focused at the same depth within the target volume, but directed at adjacent planes.

The optical delay module preferably includes a beamsplitter configured to split the laser pulse into the plurality of sub-pulses, at least two optical paths for introducing the time delay between the first sub-pulse and the second sub-pulse and an optical combiner for combining the first and second sub-pulses to form a temporally multiplexed laser pulse comprising the first and second sub-pulses, wherein the telescope delivers the temporally multiplexed laser pulse to the target volume. The optical paths may introduce the time delay via free-space propagation or via an optical fiber. The optical delay module further preferably includes a first focusing lens with a first divergence for focusing the first sub-pulse received from the beam splitter to the first depth within the target volume, and a second focusing lens with a second divergence for focusing the second sub-pulse received from the beam splitter to the second depth within the target volume.

The tissue imaging system further preferably includes a spatial multiplexing module configured to receive the temporally multiplexed laser pulse from the optical delay module. The spatial multiplexing module includes a beam splitter for splitting the temporally multiplexed laser pulse into a plurality of sub-beams including a first sub-beam and a second sub-beam. The first sub-beam and the second sub-beam are spatially separated with respect to a first image plane formed at the first depth within the target volume and with respect to a second image plane formed at the second depth within the target volume.

The spatial multiplexing module further preferably includes a scanner for angularly deflecting the first and second sub-beams, whereby the first and second sub-beams are respectively scanned on first and second focusing regions of the first and second image planes. In this aspect, the laser module is configured to output a laser beam comprising light pulses emitted at a first repetition rate, wherein the first repetition rate is at least 1 MHz and each pulse is less than 10 ps in duration. The spatial multiplexing module further preferably includes a controller configured to move the scanner at a rate based on the first repetition rate, such that a focus spot within the target volume for light output by the laser module is deflected in a first direction by approximately a width of the focus spot in the first direction between emission of successive pulses by the laser module.

The system further preferably includes a temporal focusing grating for receiving the angularly deflected first and second sub-beams from the scanner and for dispersing light pulses in the angularly deflected first and second sub-beams into their respective spectral components. In the embodiment where first and second temporal sub-pulses are to be directed at adjacent planes at the same depth of the target volume, multiple temporal focusing gratings are used.

In addition, the photodetector preferably includes a photomultiplier tube and a microlens array for focusing the photons generated within the target volume. It is also conceivable that the present tissue imaging system is provided only with the spatial multiplexing module.

In another aspect of the present disclosure, a method for high-speed imaging of fluorophores within a target volume is provided. The method includes providing a pulsed laser beam comprising pulses each less than 10 ps in duration, splitting a pulse of the pulsed laser beam into a plurality of sub-pulses including a first sub-pulse and a second sub-pulse, introducing a time delay between the first sub-pulse entering the target volume and the second sub-pulse entering the target volume, the time delay being at least 3 ns, and collecting photons generated within the target volume in response to excitation of the target volume by the first and second sub-pulses. This method may further include focusing the first sub-pulse at a first depth within the target volume and focusing the second sub-pulse at a second depth within the target volume, wherein the second depth is different than the first depth.

The excitation of the target volume by the first and second sub-pulses according to the method preferably includes excitation of fluorophores within the target volume with a two-photon excitation scheme, a three-photon excitation scheme, or a combination thereof.

Also, the method further preferably includes combining the first and second pulses to form a temporally multiplexed laser pulse comprising the first and second sub-pulses, spatially separating the temporally multiplexed laser pulse into a plurality of sub-beams including a first sub-beam and a second sub-beam, and delivering the spatially separated and temporally multiplexed laser pulse to the target volume, wherein the first sub-beam and the second sub-beam are spatially separated with respect to a first image plane formed at the first depth within the target volume and with respect to a second image plane formed at the second depth within the target volume.

The method further preferably includes angularly deflecting the first and second sub-beams with a scanner, whereby the first and second sub-beams are respectively scanned on first and second focusing regions of the first and second image planes. In addition, the scanner is preferably moved at a rate based on a repetition rate of the pulsed laser beam, such that a focus spot within the target volume for light output by the laser module is deflected in a first direction by approximately a width of the focus spot in the first direction between emission of successive pulses of the pulsed laser beam.

Here too, it is conceivable that the method only includes the steps of spatially multiplexing the beam.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6B illustrates temporally multiplexed sub-pulses penetrating in a sample, according to another implementation.

DETAILED DESCRIPTION

Two techniques for Multiplexed Scanned Temporal Focusing (MuST) are herein disclosed. The two techniques include two-photon scanning microscopy and three-photon scanning microscopy. Both disclosed MuST techniques (two and three photon) provide superior performance for volumetric calcium imaging at high frame rates compared to known technologies.

Figure 1:
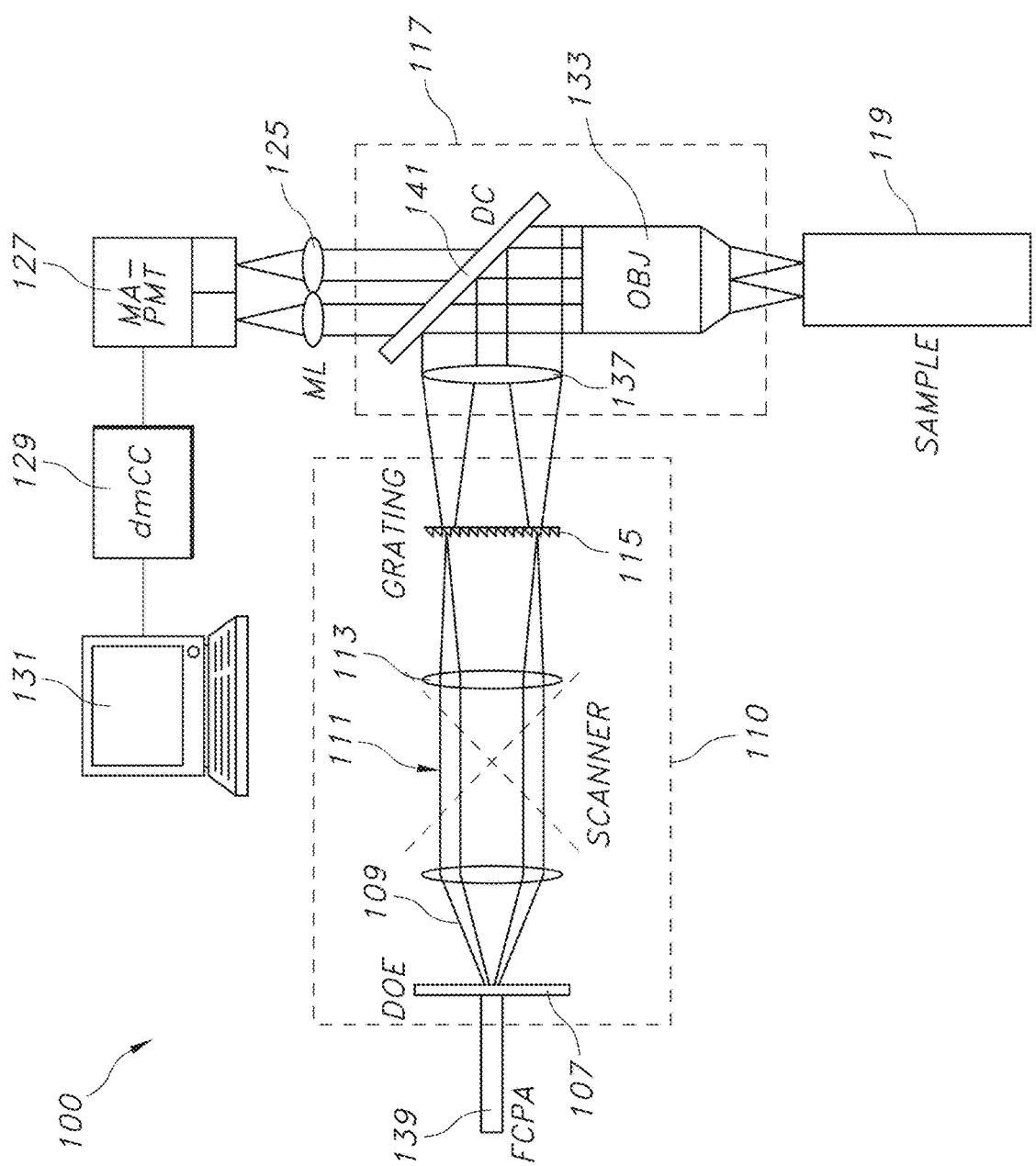
FIG. 1 is a schematic view of an example imaging system according to an aspect of the present invention.

FIG. 1 illustrates a schematic view of an example imaging system 100. Imaging system 100 includes a pulsed output laser module 139, which outputs (or emits) a pulsed main laser beam 109 comprising repeated ultrashort pulses of light (which may be referred to as "laser pulses"). For example, laser module 139 may be implemented using, for example, a commercially available or custom-built fiber-based chirped pulse amplifier (FCPA). Laser module 139 may output pulses of light at a repetition rate of, for example, 1 to 5 MHz. The temporal duration of each pulse of light may each be, for example, less than 100 ps (picoseconds), less than 50 ps, less than 20 ps, less than 10 ps, less than 5 ps, less than 1 ps, less than 100 fs (femtoseconds), less than 50 fs, or less than 20 fs. Some implementations of laser module 139 may be referred to as "femtosecond lasers." Each pulse of light delivers a laser power effective for exciting an excitation volume of a sample 119 in a single pulse of light. For example, laser module may output the pulses of light at a 1040 nm wavelength with a 1 MHz repetition rate with each pulse delivering a power of about 100 nJ (nanojoules) at a target position within sample 119.

In the example illustrated in FIG. 1, the main beam output by laser module 139 is provided to a spatial multiplexing module 110 including a beam splitter 107 (which may also be referred to as a "spatial separator"), which divides the received main beam to multiple sub-beams (which may be referred to as "beamlets"). The multiple sub-beams output by beam splitter 107 may be collectively referred to as a "beam 109." In some implementations, beam splitter 107 may include a multi-spot diffractive optical element (DOE) that splits a received incident beam into multiple sub-beams, which may be characterized by an equal intensity and equal angle to one another. There are both one-dimensional and two-dimensional (1D/2D) multi-spot diffractive optical elements. A 1D element splits a beam along a straight line whereas a 2D element produces beams arranged in a matrix of, for example, 2 by 2 or 3 by 3 spots. In some examples, beam splitter 107 splits the main beam received from laser module 139 into four sub-beams resulting in a 2 by 2 matrix of focus spots on a target (such as sample 119, as illustrated by focus spots 201, 203, 205, and 207 in FIG. 2). The division of the main beam output by laser module 139 into multiple sub-beams and focusing of the sub-beams at different positions in an imaging plane (see, for example, the positioning of focus spots 201, 203, 205, and 207 in FIG. 2) may be referred to as "spatial multiplexing."

The multiple sub-beams included in beam 109 can be expanded and directed towards scanner 111, which performs a varying, selective, and controlled (for example, by computing device 131 or another element of imaging system 100) angular deflection of beam 109, resulting in controlled positioning of focus spots in sample 119. In some examples, scanner 111 may be a 1D scanner that performs deflection of beam 109 along a straight line. In some examples, as illustrated by the examples in FIGS. 3 and 10A, scanner 111 may be a 2D scanner that performs angular deflection with respect to two axes. Scanner 111 may include, for example, one or more galvanometric mirrors, scanning refractive optics, one or more acousto-optic deflectors, and/or one or more electro-optic deflectors to controllably change the amount of angular deflection of beam 109.

After the deflection imparted by scanner 111, the beam 109 can be translated by a spherical scan lens 113 to focus the sub-beams included in beam 109 to form foci on a spectral dispersion element 115, such as a temporal focusing grating. The spectral dispersion element 115 disperses the light pulses included in beam 109 into their spectral components, which are refocused in time and space by a telescope 117 including a temporal focusing lens (TF-lens) 137 and an objective lens 133 and imaged at an image plane in the sample 119. For example, a 4 by 4 or 4 by 2 spatial and temporal multiplexing can be provided by telescope 117 in connection with other elements of imaging system 100. Examples of spatial multiplexing are illustrated in, and discussed in connection with, FIGS. 2 and 3; examples of temporal multiplexing are illustrated in, and discussed in connection with, FIGS. 5, 6A and 6B; and examples of 4 by 3 spatial and temporal multiplexing are illustrated in, and discussed in connection with, FIGS. 7-9.

Fluorophores (which may also be referred to as "fluorochromes"), such as, but not limited to, genetically encoded calcium indicators, re-emit light upon excitation by beam 109 with an intensity (or amount of photons) corresponding to the amount of fluorophores present in excited voxels. A microlens array (ML) 125 in the delay path can be included to focus the fluorescence resulting from each sub-beam included in beam 109 onto respective photodetectors, such as respective anodes of a multi-anode photon multiplier tube (MA-PMT) 127. A dichroic mirror 141 or similar optical element may be included to reduce an amount of non-fluorescent light reaching the photodetectors. A multi-channel counting card (dmCC) 129 can perform de-multiplexing in the time domain to determine a fluorescent intensity for each voxel. The de-multiplexed intensities can be collected by a computing device 131 (which may be further configured to control various aspects of imaging system 100) and further processed, displayed, or stored in a local or global memory for further access and analysis.

The imaging system 100 can dramatically increase acquisition volume and speed. In some implementations, as a result of a 4 by 4 spatial and temporal multiplexing of the light pulses in the main laser beam output by laser module 139, FOVs of up to 1 by 1 mm can be achieved using a 16 times objective. The parameters that determine the expected fluorescent signal in two-photon microscopy can be evaluated using equation (1). The number of absorbed photons per fluorophore, Na, and therefore the fluorescence signal in two-photon excitation via a pulsed laser source is proportional to:

$$N_a \sim \frac{P_0^2}{f\tau}\left(\frac{\lambda}{A}\right)^2 \Delta t \quad (1)$$

In equation (1), $P_0$ is the average laser power at the sample plane (e.g., a top surface of sample 119), $f$ s the laser's pulse repetition rate, $\tau$ is the pulse length, $\lambda$ is the central wavelength, A is the excitation area (e.g. diffraction limited area of the laser focus in case of standard two-photon scanning microscopy) at the sample, and $\Delta t$ is the dwell (or exposure) time. A key aspect of equation (1) is the quadratic dependence of the number of absorbed photons $N_a$, on A and the linear dependence on $\Delta t$. As an example, if the area element A is reduced by a factor of 10, the dwell time $\Delta t$ on a given location needs to be reduced by the same factor to maintain the same imaging frame rate. However, since $N_a \sim \Delta t/A^2$, the fluorescence yield will be increased 10 fold in this example, thereby allowing further decrease in dwell time and hence an increase in frame rate.

Therefore, for a given V-FOV and resolution, setting the excited area, for example the size of the laser focus spot in sample 119, to approximately the desired resolution may result in optimizations to imaging speeds at a given average laser power. Furthermore, the V-FOV, resolution, and the desired temporal resolution determine a voxel imaging rate, e.g., number of voxels to be imaged per second. Equation (1) supports the notion that a fluorescence yield may be optimized when the repetition rate f is set equal to the voxel imaging rate, as it allows pulse energies to be maximized (excitation with a single pulse) for a given average laser power.

The temporal focusing (TeFo) of the beam 109 circumvents limitations due to the coupling between the lateral and axial beam parameters, as shown in equation (1). In TeFo, the spectrum of a femtosecond pulsed laser is spatially dispersed by spectral dispersion element 115 and imaged onto the sample by telescope 117 including TF-lens 137 and objective lens 133. Thereby, the frequency components of a pulse in beam 109 are geometrically dispersed everywhere but at the focus of the objective lens 137. This leads to an effective reduction of the peak pulse intensity and thus lowers two-photon excitation probability outside the focal region. The axial localization of excitation can be achieved by controlling the dispersion of the pulse in the sample, while the lateral excitation pattern can independently be set by the choice of lenses and objectives.

In one implementation, calcium imaging can be improved by realizing an imaging system capable of recording, with single-cell resolution, from the majority of neurons in a 3D volume of approximately 500 by 500 by 500 μm or 1000 by 1000 by 700 μm (comparable to the size of a cortical column in the mouse neocortex), with respective temporal resolutions of greater than 20 Hz and greater than 3 Hz.

In some implementations, deep-tissue imaging performance of system 100 can be optimized by incorporating three-photon excitation. In general, conventional two-photon microscopy hippocampal imaging experiments involve invasive surgery, during which the cortex is removed and an approximately 1.5 mm deep imaging cannula-window is implanted. Even after such surgery, however, only the superficial hippocampal CA1 region becomes accessible. In contrast, the disclosed three-photon MuST imaging approach can be significantly less invasive, as it enables imaging the CA1 cell body layer at approximately 1.1 mm below the brain surface without the need of cortical aspiration. The disclosed approach also enables imaging deep hippocampal regions (e.g., CA3, DG) after cortical surgery, that is, leaving the hippocampal CA1 and whole hippocampal circuitry intact (e.g., about 1 mm below the hippocampal dorsal surface).

Additionally, two-photon microscopy may not be well suited to imaging below 1 mm depth, due to scattering of the incoming laser pulses, which exponentially reduces the excitation probability with image depth. In contrast, three-photon microscopy with excitation at approximately 1700 nm is viable for imaging the fluorescence of red, non-functional fluorescence proteins such as red fluorescent protein (RFP). Additionally, another spectral window may also exist at around 1300 to 1400 nm where the combined attenuation length by scattering and water absorption can be advantageous for deep tissue imaging. This wavelength region would correspond to the three-photon excitation of green calcium indicators such as GCaMP. As discussed above, the laser module 139 outputs ultrashort pulses of light, which are particularly advantageous for three-photon microscopy, as an intensity of a fluorescence signal resulting from three-photon microscopy (S3P) scales inversely with the pulse length (T) squared, e.g., $S_{3P} \sim T^{-2}$.

Based on the theoretical calculation associated with the disclosed approach, in typical three-photon microscopy, the absorption cross-sections can be calculated as approximately $10^{-82}$ cm$^2$ (s/photon)$^2$. In addition, the concentration expression of GCaMP can be calculated as approximately 20 μm. The calculation results determine that the combination of the disclosed MuST approach with the three-photon excitation can provide sufficient signals to facilitate high frame rate (e.g., 10 frames per second and more) for in vivo imaging at depths beyond 1 mm over a FOV of 500 by 500 μm.

The disclosed imaging system 100 can provide unbiased calcium imaging of unprecedentedly large V-FOVs (e.g., 500 by 500 by 500 μm at 20 Hz, or 1 by 1 by 0.7 mm at 3 Hz) with faithful single-cell resolution at multi-hertz time resolution. Such an imaging system provides the ability to monitor the dynamics of network activity of tens of thousands of neurons near-simultaneously. In the mammalian cortex, this capability provides the opportunity to gain insights into the computational principles for information processing as it will allow capturing and correlating the dynamics of the network activity across cortical layers.

Further, the disclosed approach allows whole-brain imaging in smaller model organisms, such as Drosophila or zebrafish and with its extension to three-photon imaging allows for non-invasive cellular-resolution imaging at tissue depths that were previously unavailable (e.g., deep cortical areas greater than 1 mm).

Considering the average size of neurons in the mammalian cortex (approximately 10 μm diameter), spatial resolution can easily be reduced isotropically to approximately 5 μm while still allowing faithful single-cell resolution. This is particularly the case, even in dense cortical regions, when nuclear localized calcium indicators are used. Fundamental constraints from optics, however, do not allow arbitrary shaping of the laser spot size to such focal sizes, since lateral localization of excitation (w) and axial localization of excitation (z) are intrinsically coupled through $z \sim 2 w^2$. Thus, generating a laterally 5 μm wide laser focus, the same focus would extend axially over approximately 40 μm, thus not providing sufficient optical sectioning for single-neuron resolution. As noted above, Temporal Focusing (TeFo) circumvents the above limitation of the coupling between the lateral and axial beam parameters In various instances, laser pulse energy of at most approximately 100 nJ at a repetition rate of 4 MHz may be required to achieve high-speed single cell resolution calcium imaging by the imaging system 100 over the envisioned volume of 500 by 500 by 500 μm at 3 Hz volume rate. The calculated laser power may further assume bi-directional resonant laser scanning with 12 kHz, with the excitation spot covering a volume of 5 by 5 by 5 μm.

In an exemplary implementation, the imaging system 100 can be used for functional calcium imaging in scattering brain tissue, based on scanned temporal focusing. To have a reliable comparison between different optical imaging and scanning parameters during the characterization and test phase, standard non-living samples with stable fluorescence properties, which nevertheless resemble the scattering properties of live mouse brains (so-called 'phantom-tissues') can be employed. Furthermore, custom test samples with uniformly distributed sub-diffraction fluorescence beads can be used to measure and optimize the effect of aberrations and distortions due to the large scan angles and lengthy tube lens employed in the disclosed setup. The imaging system 100 can improve imaging speed and FOV. Improvements can be made to the imaging volume, FOV and volume speed by incorporating spatial as well as temporal multiplexing strategies into the scanned temporal focusing microscope.

In spatial multiplexing, the volumetric imaging speed can be mostly limited by the frequency of resonant scan mirrors (about 12 kHz), if used for scanner 111. Therefore, a viable route to increased overall speed is spatial multiplexing, in which the excitation laser beam can, for example, be divided into 4 sub-beams, which can then be directed to sub-areas within the FOV and scanned in parallel. Custom diffractive optical elements can be used to divide the main beam in order to increase efficiency and homogeneity compared to previous approaches bases on microlens arrays. The optical design for spatial multiplexing has to be carefully chosen, such that fluorescence excited by each beamlet can be imaged onto a separate photodetector. To this end, a multi-anode PMT (MA-PMT) 127 can be used. In one implementation, a MA-PMT 127 can be used in combination with a custom microlens array 125 in the detection path that focuses the fluorescence from the sub-areas onto the detector units of the MA-PMT 127.

The excitation and detection pathways can be modeled using an optical design software such as, for example, ZEMAX® using the computing device 131 to minimize crosstalk of the fluorescence on the individual detector elements for the given imaging depth and tissue scatter, while at the same time optimizing collection efficiency. This crosstalk can be minimal for foci separations of approximately 500 μm and a depth less than 700 μm. Signals from different MA-PMT 127 pixels can be collected synchronously in photon counting mode by using a multi-channel photon counter card 129. In addition, de-multiplexing approaches such as deconvolution in post-processing can further suppress scattering-induced crosstalk.

Temporal multiplexing is a viable alternative to, and powerful in combination with, spatial multiplexing, in which the excitation laser can be split up and a relative time delay can be introduced to the individual beamlets. Each of the beamlets can then be either directed to another sub-area of the image FOV or focused to a different image plane. This is an especially promising approach, as the exemplary repetition rate of 4 MHz corresponds to 250 ns in between pulses, thus allowing ample time to divide the beamlets. In imaging system 100, the individual beams can be delayed by 10 ns, relative to each other, which is sufficiently long compared to the typical lifetime of the GCaMP fluorophores (e.g., about 3 ns). The beamlets can then be focused to different z-planes (shown in FIGS. 7 to 9) to allow simultaneous image acquisition. The de-multiplexing can then be performed in electronic post-processing using a fast multi-channel counter (dmCC) 129, by assigning the photons/signal to the area/plane based on the arrival time at the MA-PMT 127.

The required average laser power in milliwatts (mW) at the sample 119 can be plotted as a function of volume size (FOV) and a diameter of temporal focused spot on the sample 119, which equals optical resolution in imaging system 100. For example, a desirable trade-off can be achieved where the V-FOV is 500 by 500 by 500 μm, the spot size is 5 μm wide, and approximately 150 mW power is needed. The 150 mW power can be equivalent of 50 nanojoules (nJ) per pulse at a 3 MHz repetition rate.

As another example, if the scan speed and digitization are set such that there is effectively only one laser pulse per pixel, sufficient GCaMP signal can be generated by approximately 100 nJ pulse energy, even at 500 μm depth and with a laser wavelength of 1040 nm, which is suboptimal for GCaMP.

In one implementation, the temporal focusing technique (TeFo) can be used in a wide-field configuration together with a camera-based detection scheme. A scanned temporal focusing scheme can be used, which is not prone to scattering. In addition, the generated fluorescence, including scattered components, can be efficiently coupled by custom-designed wide-angle collection optics onto a photomultiplier tube (PMT) 127 and assigned to an image pixel. Although the increased excitation volume of 5 by 5 by 5 μm may naturally lead to a decreased optical resolution by the same magnitude, it can still be sufficient to resolve individual neuronal somata in the mouse cortex, a sensitive and most commonly used surrogate readout for neuronal output spiking in "in vivo" functional imaging.

In some exemplary implementations, high-speed 3D calcium imaging in awake and behaving mice can be enabled. For example, the 3D imaging can be performed at volumes extending to 500 by 500 by 500 μm and at a temporal resolution higher than 3 Hz. The two-photon microscopy design based on TeFo, which achieves the high-speed 3D calcium imaging, brings together several features. For example, the excitation volume can be 'shaped' according to the size of the structure of interest. This results in an increased signal per voxel while facilitating operation in the non-saturated fluorescence regime. In addition, the fiber-based amplified laser source (FCPA) 130, as disclosed, can be designed to deliver maximum pulse energy at a repetition rate matching the voxel imaging rate thus resulting in optimized signal-to-noise ratio. Furthermore, the FCPA's repetition rate can be readily adjustable whereby the optimized signal-to-noise configuration can be maintained for different volumetric imaging needs.

The modular design of the disclosed techniques allows a straightforward incorporation of a, for example, 4 to 8 times spatial and/or temporal multiplexing into the design directly translating into an increase of V-FOV and/or temporal resolution by the same factor. In addition, integration of three-photon scanning microscopy into the imaging system 100 enables non-invasive imaging of deep brain structures by massively reducing out of focus fluorescence at depth and scattering of the excitation beam. This can be achieved via an optical parametric amplifier (OPA) that can shift the FCPA's emission wavelength to about 1400 nm.

In various implementations, by employing a light-sculpting approach, the excitation area can be shaped in volume to the same order of magnitude as the structure of interest (e.g., neuronal somata). Therefore, significantly more GCaMP fluorescence can be collected per imaging voxel, while retaining non-saturating excitation levels of the fluorophores. The reduced spatial resolution can in turn be traded for faster volume imaging rates, as fewer points per line, fewer lines per frame and fewer image planes per volume have to be scanned.

Figure 2:
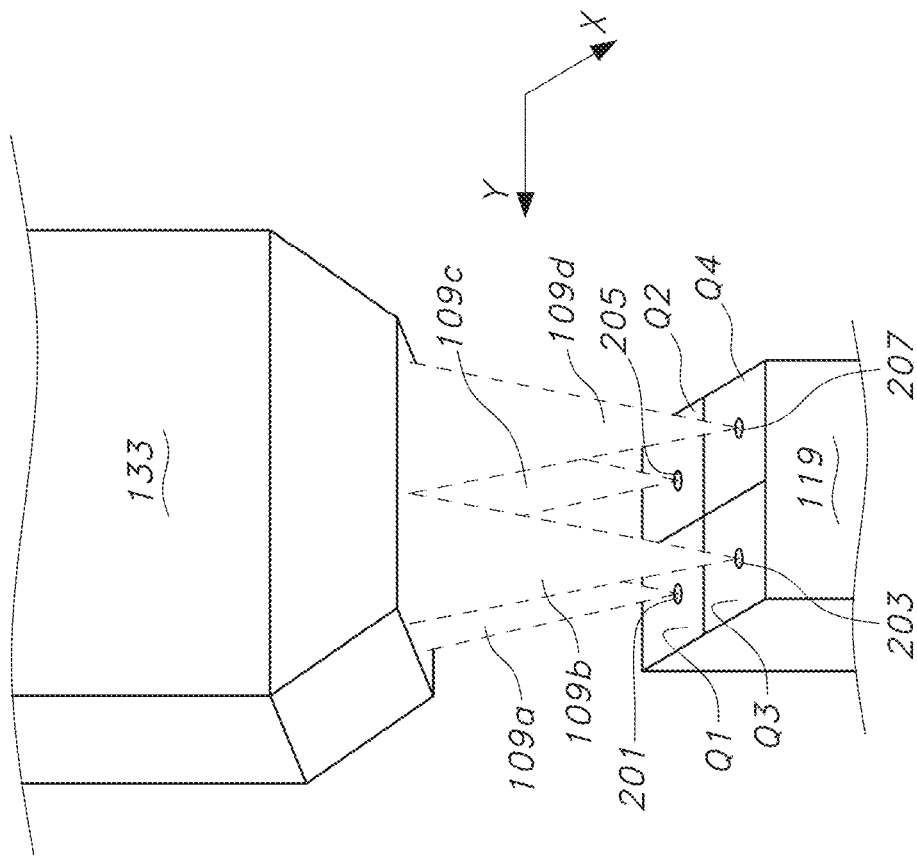
FIG. 2 is an enlarged view of the spatial multiplexing of temporally focused laser beamlets shown in FIG. 1.
Figure 2:
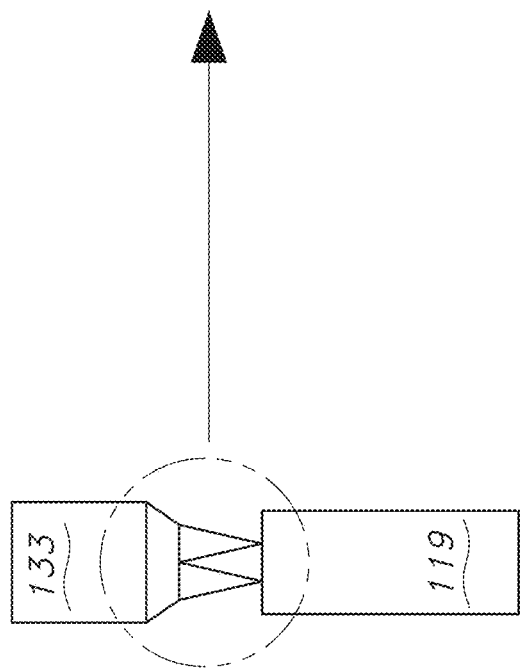

FIG. 2 illustrates an enlarged view of spatial multiplexing of temporally focused laser beamlets, according to an implementation. Depending on the availability of laser power at sample 119, a 4 times spatial multiplexing (e.g., 2 by 2) in the spatial domain can be selected, with focus spots for the beamlets 109a, 109b, 109c, and 109d included in beam 109 being separated by, for example, 500 µm. As shown in FIG. 2, the 2 by 2 spatial multiplexing can be applied by dividing the sample 119 into 4 quarters Q1, Q2, Q3 and Q4 and focusing the dispersed beamlets into the 4 quarters. Temporally focused spots 201, 203, 205, and 207 can be scanned over the sample 119 such that each temporally focused spot is scanned within one FOV Q1, Q2, Q3 or Q4.

As previously discussed with regards to equation (1), spatial and temporal multiplexing depend on the available laser power, since each beamlet has to maintain the same pulse energy. A custom anti-reflection coated microscope objective 133, as well as careful selection of other temporal focusing optics ensures that losses due to optic surface reflection can be kept to a minimum.

Figure 3:
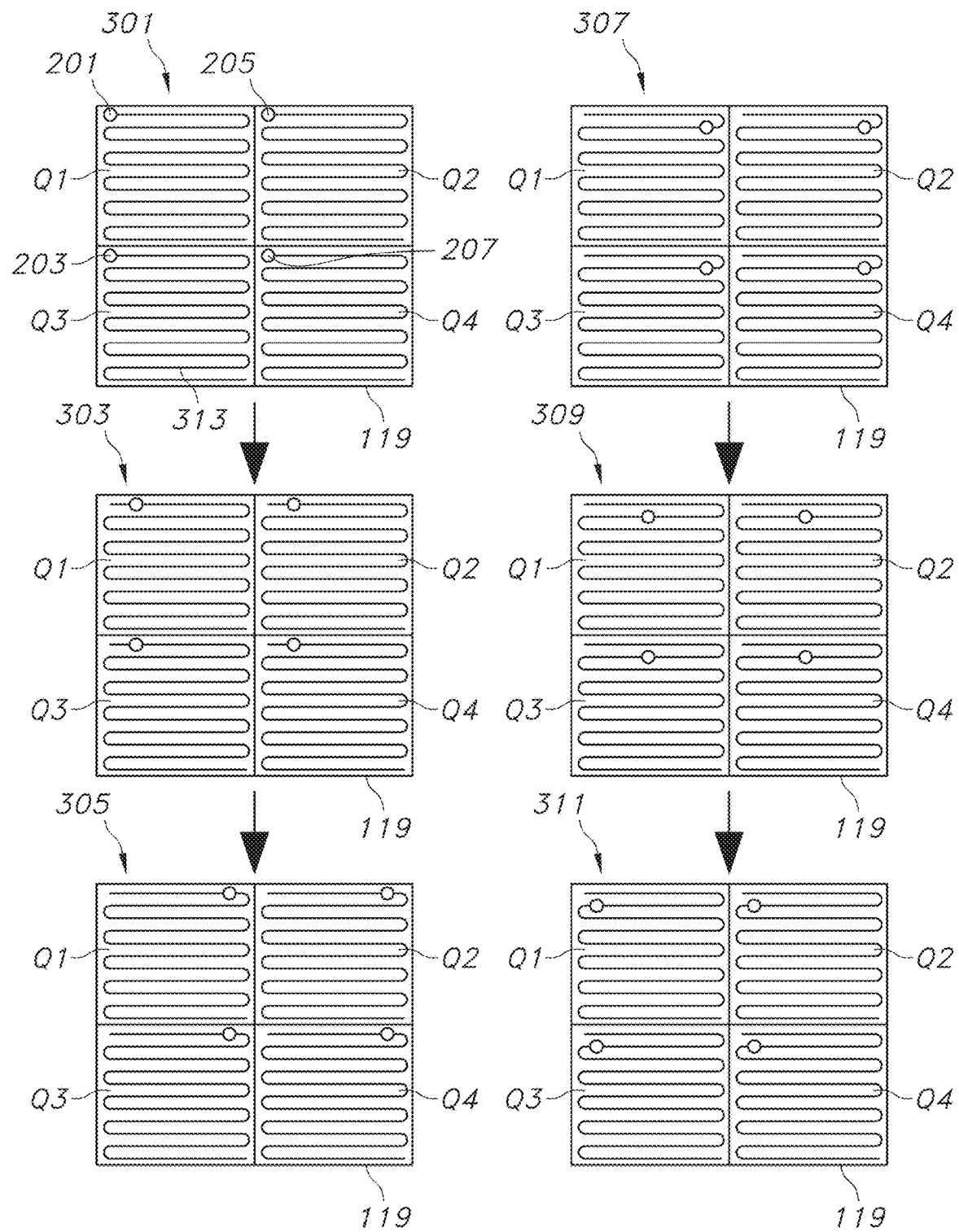
FIG. 3 illustrates scanning of a spatially multiplexed sample, according to an implementation.

FIG. 3 illustrates scanning of a spatially multiplexed sample, according to an implementation. Diagrams 301, 303, 305, 307, 309, and 311 of FIG. 3 illustrate spatial multiplexing of a sample 119 where the sample 119 is divided into 4 quarters Q1, Q2, Q3 and Q4. The temporally focused laser spots 201, 203, 205, and 207 scan the area of sample 119 within the quarters Q1, Q2, Q3 and Q4, respectively. The scanning of the sample can be performed by the scanner 111 based on a sinuous pattern 313, although other patterns may be used. During the sinuous scan, each of the temporally focused spots 201-207 scan the respective area Q1 to Q4 by moving within the scan area based on the sinuous pattern 313.

Figure 4A:
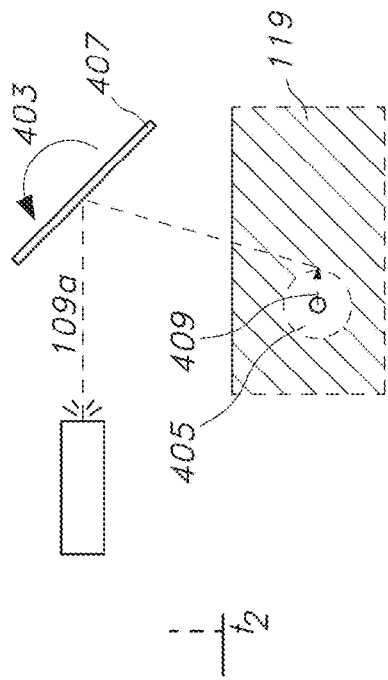
FIG. 4A-4D illustrate stages of scanning of the sample by the imaging system, according to an implementation.
Figure 4B:
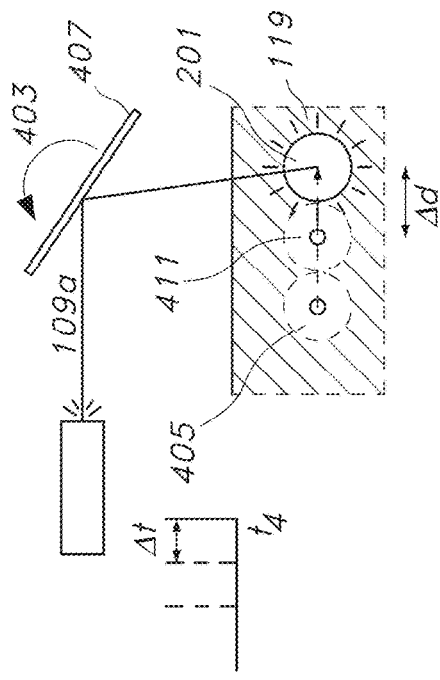
Figure 4C:
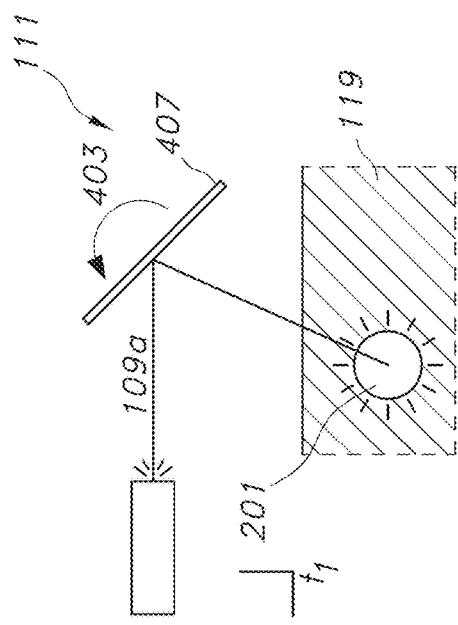
Figure 4D:
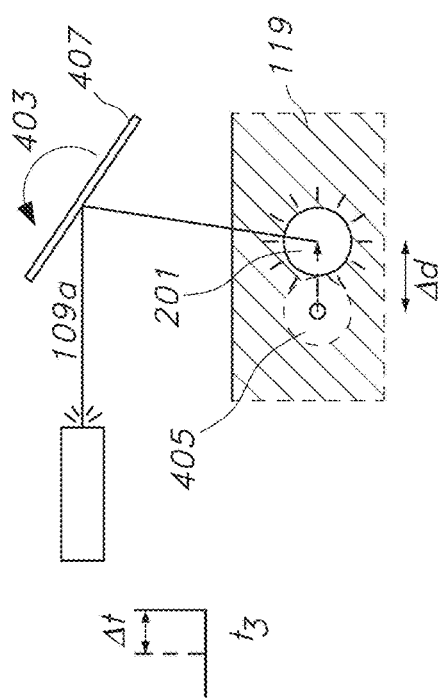

FIGS. 4A-4D illustrate stages of scanning of the sample 119 by the imaging system, according to an implementation. FIGS. 4A-4D are simplified representation of movement of beamlet 109a over the sample 119 by the imaging system 100 to scan the sample 119. The beamlet 109 is focused on sample 119 by the telescope 117 (not shown in FIGS. 4A-4D) and the beamlet 109a is scanned through the sample 119 by changes to an amount of angular deflection applied to beamlet 109a by a scanner element 407 included in scanner 111. The scanner element 407 continuously changes the angle of deflection of the beamlet 109a, as shown as arrow 403, which results in the change in location of focus spot 201 between FIGS. 4A to 4D. As a result of the moving beamlet 109a, the focused spot 201 can move over the sample 119 and scan the sample. For example, at time t1 shown in FIG. 4A the focused spot 201 is in the location shown. At time t2 (FIG. 4B) the focused spot 201 has moved from location 405 (the location of focused spot 201) and moves in the direction shown as 409. At time t2, laser module 139 is not outputting a light pulse, although FIG. 4B illustrates a path a hypothetical beamlet 109a would take if a pulse was being output at time t2. FIG. 4C illustrates the focused spot 201 at time t3 ($\Delta t \approx t3-t1$) where the displacement distance of focused spot 201 between initial location 405 and the location illustrated in FIG. 4C is shown as $\Delta d$. Similarly, after another time lapse $\Delta t$ from t3 to t4 in FIG. 4D ($\Delta t \approx t4-t3$) the focused spot 201 moves from location 411 (the location of focused spot 201 in FIG. 4C at time t3) to the location shown in FIG. 4D. As a result, the scanner 111 scans the focused spot 201 through sample 119 by moving the beamlet 109a continuously such that the focused spot 201 of the beamlet 109a on the sample 119 moves a distance $\Delta d$ for each time lapse $\Delta t$. Distance $\Delta d$ is approximately equal to the width of focus spot 201, as illustrated by the difference in positions among initial location 405, location 411, and the location of focus spot 201 in FIG. 4D.

Figure 5:
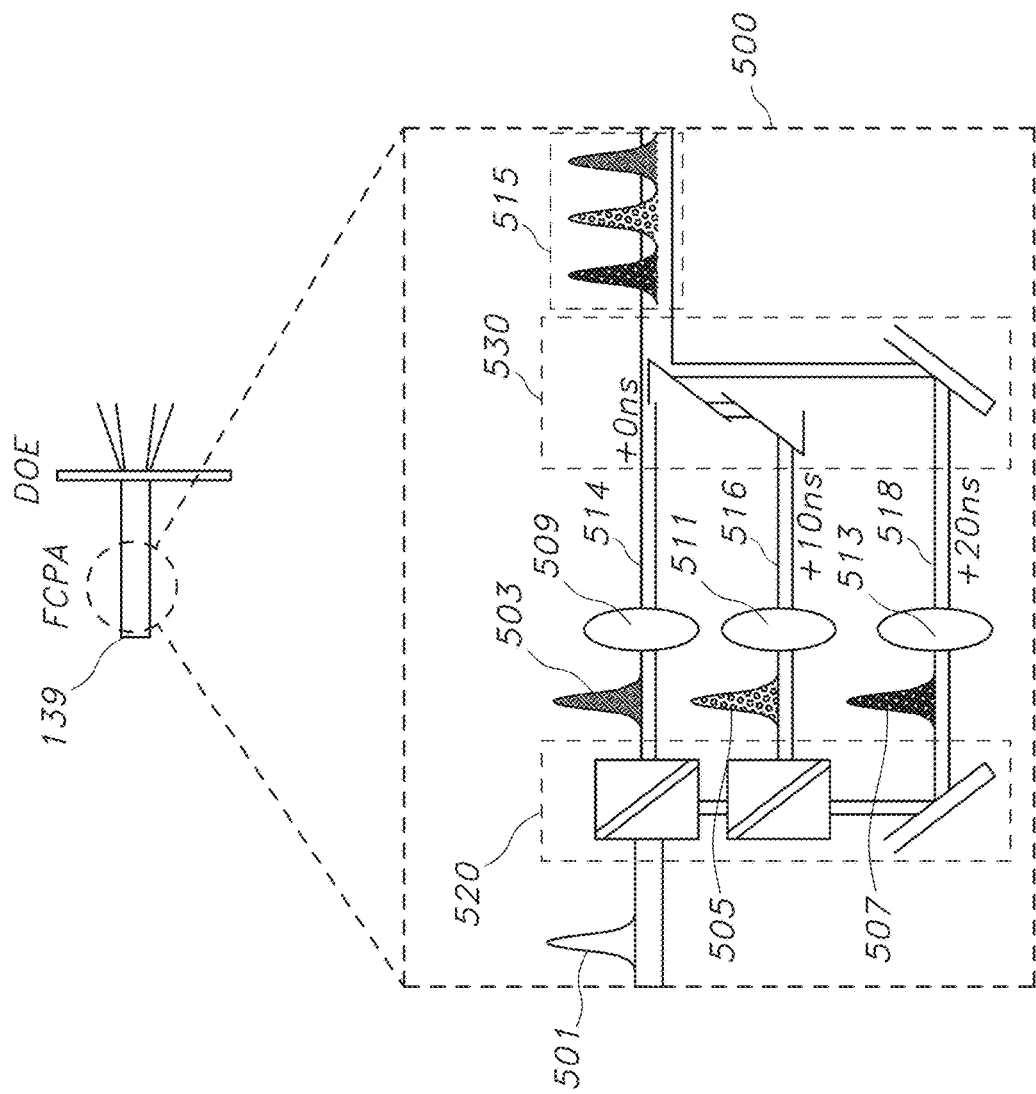
FIG. 5 is a schematic view of a temporal multiplexing module, according to an implementation.

FIG. 5 illustrates a visualization of temporal multiplexing, according to an implementation. The laser module 139 may include an optical delay module 500 configured to divide an optical pulse into multiple sub-pulses and introduce a relative time delay between the individual sub-pulses or an alternative way of introducing time delays between sub-pulses. In the example illustrated in FIG. 5, optical delay module 500 includes a three-way beam splitter 520 that divides a main optical pulse 501 generated by laser module 139 into three sub-pulses 503, 505, and 507. The three sub-pulses 503, 505 and 507 travel from the three-way beam splitter 520 to an optical combiner 530 via respective optical paths 514, 516 and 520. The optical paths 514, 516 and 518 may simply be conduits for free space propagation or they may take the form of optical fibers. In each case, however, there is a difference in the path lengths of the optical paths so that the time required for each of the sub-pulses 503, 505, 507 to travel their respective path is different.

Thus, the length of the second optical path 516 for the second sub-pulse 505 can be chosen to differ with respect to the length of the first optical path 514 for the first sub-pulse 503 so that a first time delay of approximately 10 ns (nanoseconds) relative to sub-pulse 503 is introduced to sub-pulse 505. Similarly, a second time delay of approximately 20 ns relative to sub-pulse 503 (and 10 ns relative to sub-pulse 505) is introduced to the third sub-pulse 507 by providing the third optical path 518 with an appropriate length with respect to the first and second optical paths.

The multiple sub-pulses 503, 505, and 507 are recombined by an optical combiner into a main beam output, or multiple outputs in close proximity by laser module 139. The optical combiner may be a combination of mirrors and/or transmissive elements or other elements arranged in a manner to redirect the sub-pulses in the same direction. In particular, the optical combiner can take the form of a polarizing or non-polarizing optical beam splitter. For convenience of discussion, the combined sub-pulses may be collectively referred to as "optical pulse 515" or a "set of sub-pulses."

The optical delay module 500 also preferably includes an arrangement of focusing lenses 509, 511, 513 disposed between the three-way beam splitter 520 and the optical combiner 530. Sub-pulse 503 can be focused by lens 509 with a first divergence causing it to be focused to a first z-plane in sample 119. Sub-pulse 505 is focused by lens 511 with a second divergence causing it to be focused to a second z-plane in sample 119 that is different than the first z-plane. Sub-pulse 507 is focused by lens 513 with a third divergence causing it to be focused to a third z-plane in sample 119 that is different than the first and second z-planes. In particular, these focusing lenses and corresponding angle and position of the other optical elements can be arranged and chosen such that all pulses are focused at the same depth within the target volume, but directed at adjacent planes, as will be discussed further below with respect to FIG. 6B.

In some examples, the optical pulse 515 may be sent to a beam splitter, such as beam splitter 107 illustrated in FIG. 1, to perform both spatial and temporal multiplexing using multiple sub-beams each comprising optical pulses, such as optical pulse 515, that include multiple sub-pulses. In some examples, an imaging device may use temporal multiplexing with spatial multiplexing, and not perform that beam splitting subsequent to dividing main optical pulse 501 into the series of time-delayed sub-pulses. Although the examples illustrated in this disclosure divide a main optical pulse into three sub-pulses for temporal multiplexing, in some examples a main optical pulse may instead be divided into two sub-pulses, or may be divided into 4 or more sub-pulses with a relative time delay between the sub-pulses.

Although the examples illustrated in this disclosure use a relative time delay of approximately 10 ns between the sub-pulses 503, 505, and 507 included in optical pulse 515, other amounts of time delay may be used. For example, where there is a repetition rate of 4 MHz for main optical pulses 510, which corresponds to 250 ns between successive pulses, for three sub-pulses a relative time delay of up to 250 ns/3, or approximately 80 ns may be used between sub-pulses. The relative time delay should be longer than an expected fluorescence decay time, which is approximately 3 ns for the GCaMP fluorophores; thus, a relative time delay that is longer than approximately 3 ns is preferable for such applications. In some examples, the relative time delay may 100 ns or longer, 50 ns or longer, 20 ns or longer, 10 ns or longer, 5 ns or longer, 2 ns or longer, or 1 ns or longer.

Depending on the desired amount of laser power at the sample 119, in some examples a 4 times multiplexing (e.g., 2 by 2) in the spatial domain can be selected, with foci 109 separated by 500 µm, in combination with up to 4 times multiplexing in the temporal domain, to simultaneously image several z-planes (similar to the 4 by 3 spatial and temporal multiplexing illustrated in FIGS. 6-9). With these improvements, a V-FOV 1 by 1 by 0.7 mm can be achieved with a frame rate of at least 3 Hz. Alternatively, temporal multiplexing can be employed without spatial multiplexing to image a V-FOV of 500 by 500 by 500 µm with a frame rate of at least 12 Hz. It is noted that even at higher pulse energies due to using a single optical pulse for imaging each voxel, bio-damage is not foreseen to be a limiting factor. This is because the power is distributed over a volume of approximately 5 by 5 by 5 µm, which is about 1000 times larger than the diffraction limited volume conventionally used in standard two-photon microscopy.

Figure 6A:
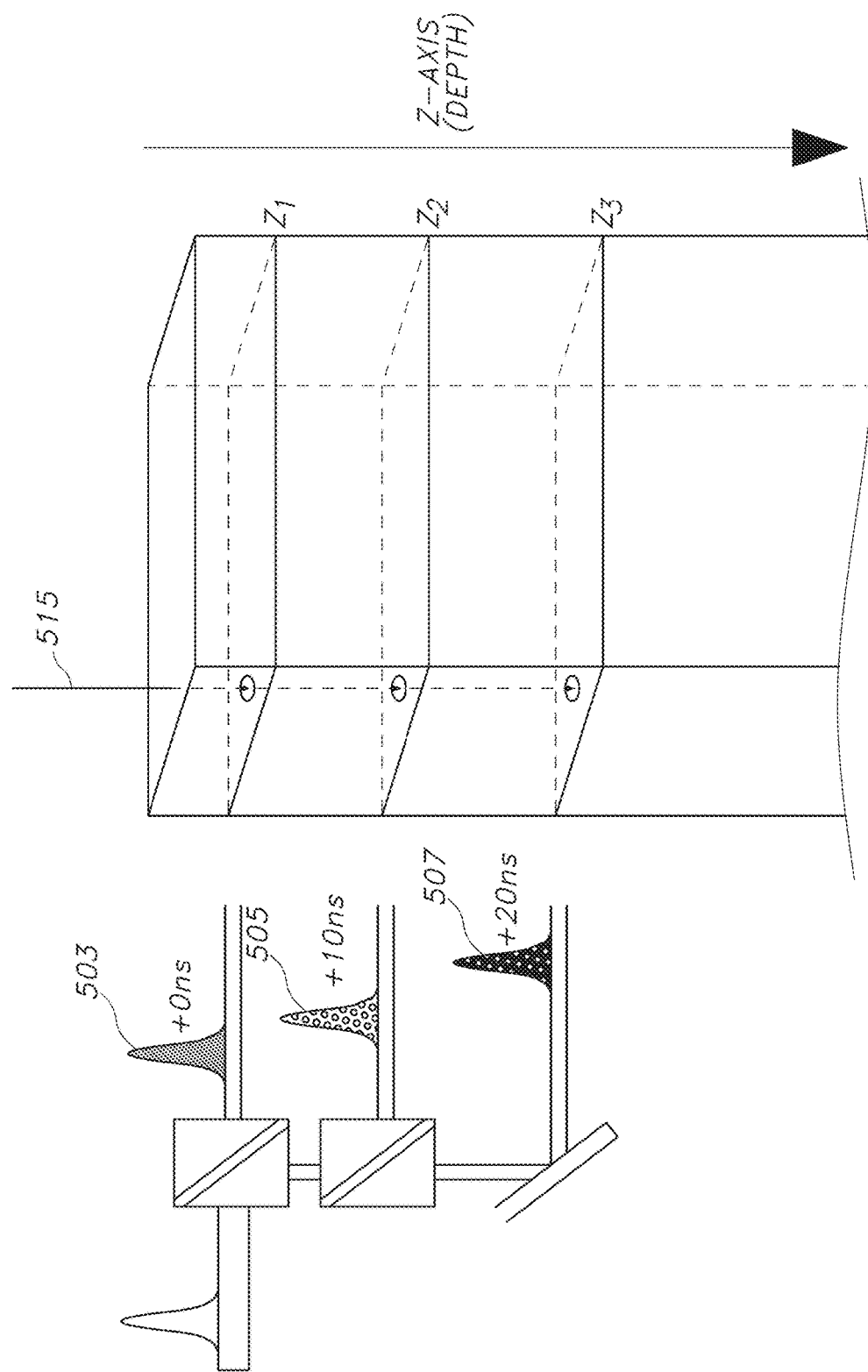
FIG. 6A illustrates temporally multiplexed sub-pulses penetrating in a sample, according to an implementation.

FIG. 6A illustrates temporally multiplexed sub-pulses penetrating in a sample, according to an implementation. The temporally multiplexed sub-pulses 503, 505, and 507 of FIG. 5 recombined into optical pulse 515 are sent to sample 119 much as illustrated by the sub-beam paths illustrated in FIG. 1. As a result of the different divergences applied to each sub-pulse 503, 505, and 507, each sub-pulse 503, 505, and 507 is focused to a different respective z-plane in sample 119. In the example illustrated in FIG. 6A, sub-pulse 503 is focused to, and produces a respective focus spot for exciting sample 119 on, a first z-plane at depth Z1; sub-pulse 505 (with a time delay of 10 ns relative to sub-pulse 503) is focused to, and produces a respective focus spot for exciting sample 119 on, a second z-plane at a depth Z2 different than, and greater than, depth Z1; and sub-pulse 507 (with a time delay of 20 ns relative to sub-pulse 503 and a time delay of 10 ns relative to sub-pulse 505) is focused to, and produces a respective focus spot for exciting sample 119 on, a third z-plane at a depth Z3 different than, and greater than, depths Z1 and Z2. For convenience of discussion, this may also be described as sub-pulse 503 penetrating to depth Z1, sub-pulse 505 penetrating to depth Z2, and sub-pulse 507 penetrating to depth Z3.

Figure 13:
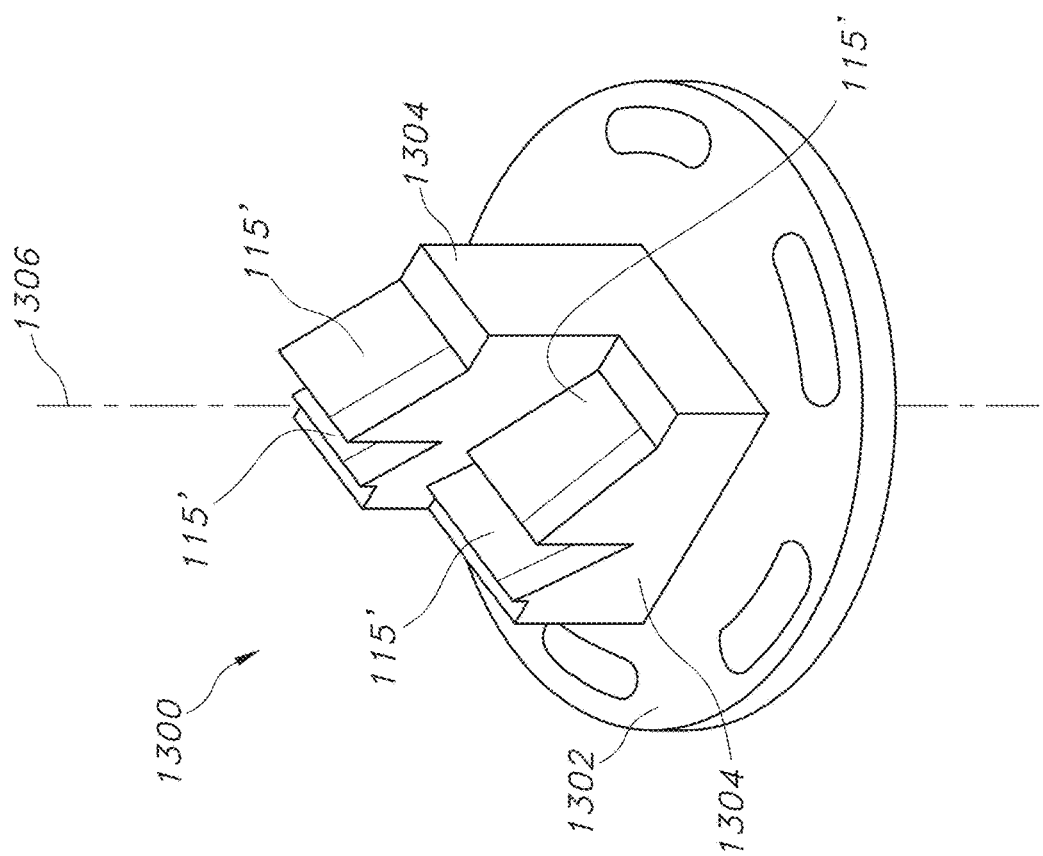
FIG. 13 shows a grating assembly for supporting multiple temporal focusing gratings.

To achieve focusing at different depths, as shown in FIG. 6A, multiple temporal focusing gratings 115' arranged at slightly different axial positions along the beam propagation are needed. A particular way of achieving this is to use a multi element grating assembly 1300 that supports such multiple temporal focusing gratings 115' is shown in FIG. 13. The assembly 1300 generally includes a base 1302 formed with several legs 1304 extending upwardly from the base and a temporal focusing grating 115' supported at the end of each leg. The legs 1304 have different respective heights with respect to the base 1302 such that the temporal focusing gratings 115' will be positioned at different axial positions along the beam path 1306, (which will be perpendicular to the base 1302 when the assembly 1300 is installed in the system).

FIG. 6B illustrates temporally multiplexed sub-pulses penetrating in a sample, according to an implementation using a single grating 115, as shown in FIG. 1. The temporally multiplexed sub-pulses 503, 505, and 507 of FIG. 5 are sent to sample 119 such that the sub-pulses are focused at the same depth of the sample, but are directed at adjacent planes. In the example illustrated in FIG. 6B, sub-pulse 503 is focused to, and produces a respective focus spot for exciting sample 119 on, a first planar region at depth Z1; sub-pulse 505 (with a time delay of 10 ns relative to sub-pulse 503) is focused to, and produces a respective focus spot for exciting sample 119 on, a second planar region at the same depth Z1; and sub-pulse 507 (with a time delay of 20 ns relative to sub-pulse 503 and a time delay of 10 ns relative to sub-pulse 505) is focused to, and produces a respective focus spot for exciting sample 119 on, a third planar region at the same depth Z1 as the first and second planar regions.

Although only three temporally multiplexed sub-pulses are shown in FIGS. 6A and 6B, the number of temporally multiplexed sub-pulses is not limited to three; for example, four or more sub-pulses with respective delays and focusing depths/planar regions can be used. Although FIG. 6A illustrates an example in which sub-pulses are focused to increasing depth in correlation with increasing time delay, focus depth and time delay may not be related in this manner in some examples.

Figure 7:
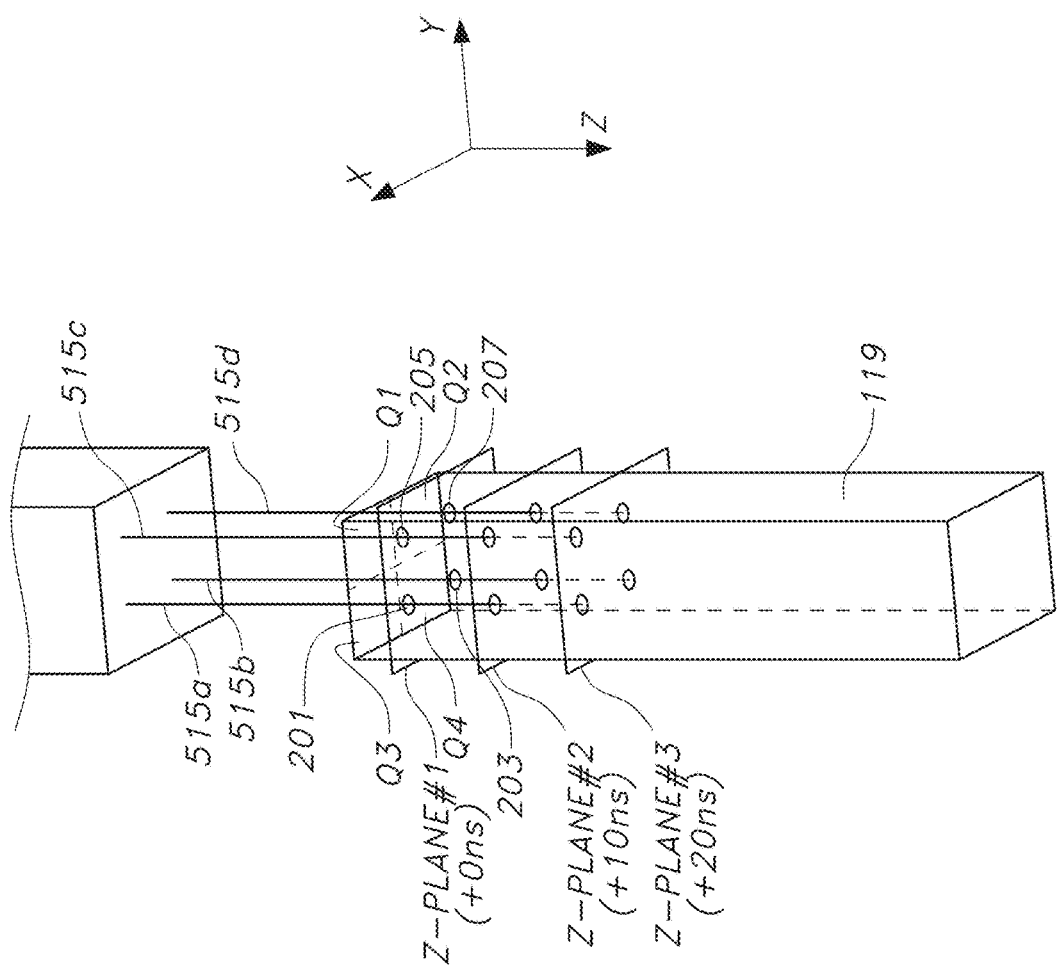
FIG. 7 is a schematic representation of a temporally and spatially multiplexed beam penetrating in a sample, according to a first sequence of an implementation of a method according to the present invention.
Figure 8:
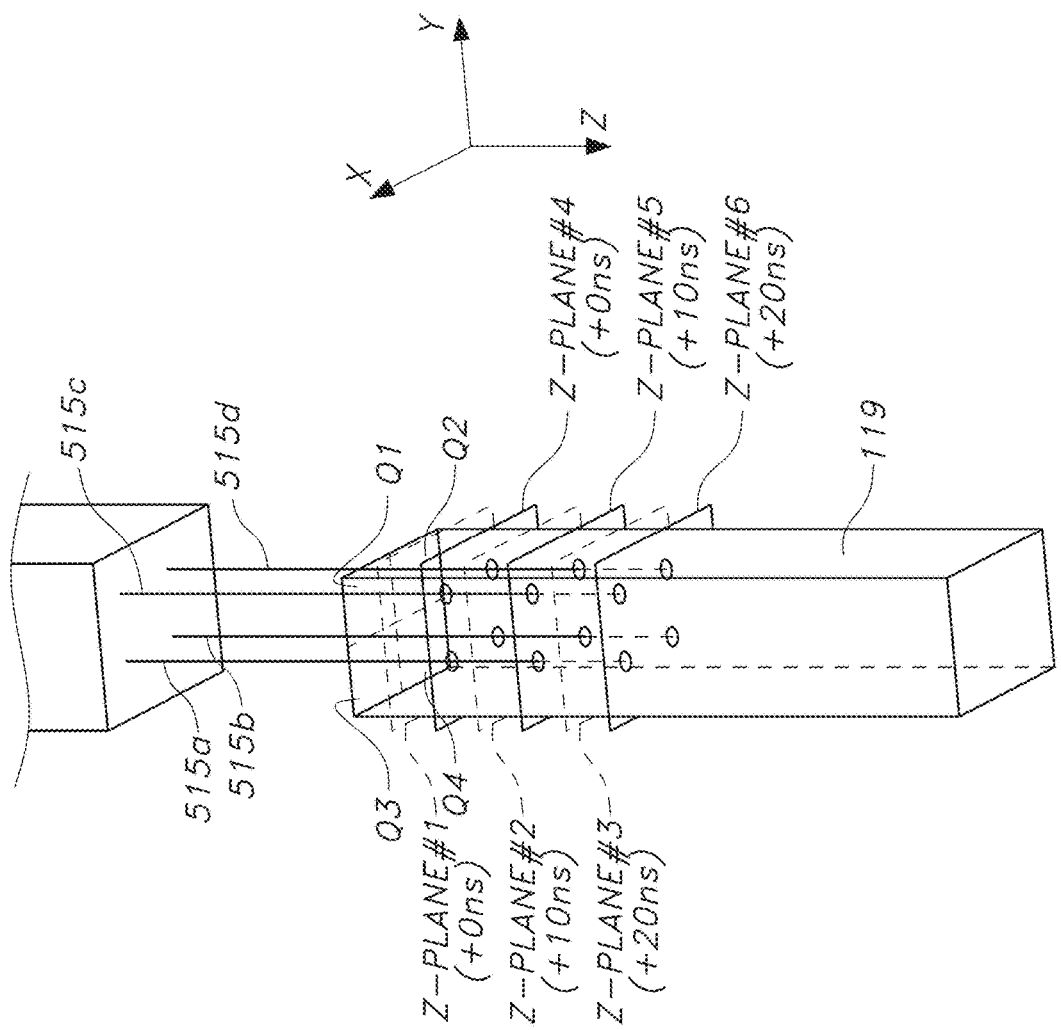
FIG. 8 is a schematic representation of a temporally and spatially multiplexed beam penetrating in a sample, according to a second sequence of an implementation of a method according to the present invention.
Figure 9:
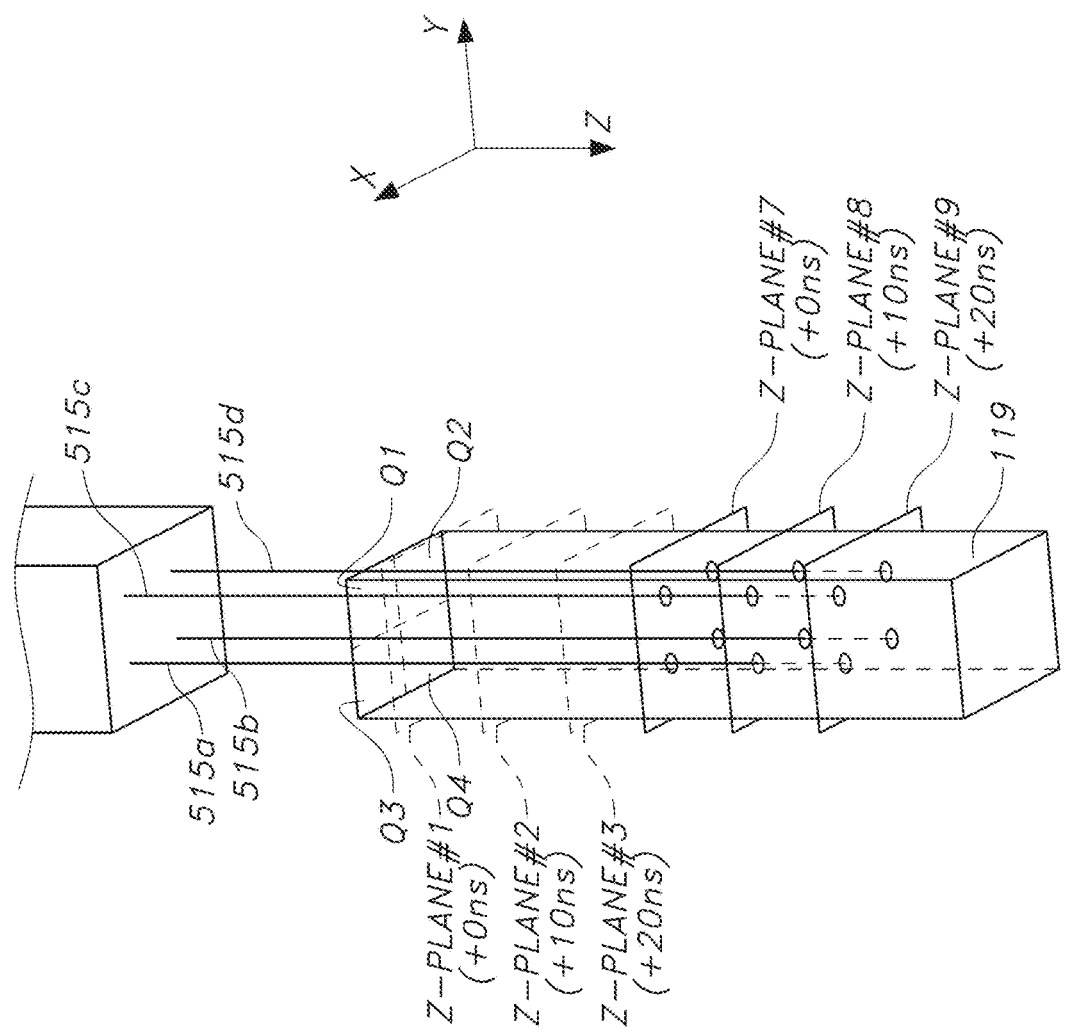
FIG. 9 is a schematic representation of a temporally and spatially multiplexed beam penetrating in a sample, according to a third sequence of an implementation of a method according to the present invention.

FIGS. 7, 8, and 9 illustrate visualizations of a temporally and spatially multiplexed beam, comprising multiple sub-beams each delivering optical pulses that each comprise multiple sub-pulses, penetrating in a sample, according to an implementation. Specifically, these visualizations relate to an imaging system using 4 by 3 spatial and temporal multiplexing, with 4 sub-beams 515a, 515b, 515c, and 515d each directed to a respect part (in these examples, respective quadrants Q1-Q4) and each repeatedly delivering sets of 3 sub-pulses that are relatively time delayed and focused at respective and different depths (in respective z-planes). The spatial multiplexing resulting in the four sub-beams 515a, 515b, 515c, and 515d may be performed as described above, such as with respect to FIGS. 1-3, and the temporal multiplexing resulting in optical pulses each comprising sets of three sub-pulses may be performed as described above, such as with respect to FIGS. 5 and 6. Deflection of the sub-beams 515a, 515b, 515c, and 515d to scan voxels within their respective parts of sample 119 may be performed as described above, such as with respect to FIGS. 1, 3, and 4. Although only four spatially multiplexed sub-beams 515a, 515b, 515c, and 515d are shown, the number of spatially multiplexed sub-beams is not limited to four. The sample 119 can be divided into more than four parts along with a corresponding increase in the number of sub-beams. Likewise, more than three sub-pulses may be included in each set of sub-pulses, with a corresponding increase in the number of z-planes Each sub-beam 515a-515d comprises and repeatedly delivers temporally multiplexed optical pulses each comprising multiple sub-pulses, such as the temporally multiplexed sub-pulses 503, 505, and 507 included in optical pulse 515 illustrated in FIGS. 5 and 6, and the sub-pulses penetrate into sample 119 at respective depths Z1 (corresponding to z-plane #1), Z2 (corresponding to z-plane #2), and Z3 (corresponding to z-plane #3). In addition, each sub-beam 515a-515d is used to scan one respective part or division (e.g., quarter Q1, Q2, Q3, and Q4) of the sample 119. As a result, a three dimensional scanning of the sample can be provided in which full 2D scanning sequence performed by an optical scanner (such as scanner 111 discussed in connection with FIG. 1 performing one pass of the sinuous pattern 313 illustrated in FIG. 3) results in the sample 119 being scanned by scanning 12 focus points through the imaging planes at three different depths shown as Z-plane #1, Z-plane #2, and Z-plane #3.

In FIG. 8, after imaging the first set of three planes z-plane #1, z-plane #2, and z-plane #3, the focus spots for the sub-beams 515a-515d continue penetrating into the sample 119, such that the Z-planes move in the z direction and, for example, Z-plane #1 moves from its previous location to a new location Z-plane #4. Similarly, Z-plane #2 and Z-plane #3 move to new locations, Z-plane #5 and Z-plane #6, respectively. Such changes in location may be continued such that the voxels between z-plane #1 and z-plane #2 are all scanned.

In FIG. 9, another of moving the planes is illustrated. Rather than moving z-plane #1 to a new position between z-plane #1 and z-plane #2, z-plane #1 is moved to z-plane #7 at a depth greater than z-plane #3.

Figure 10A:
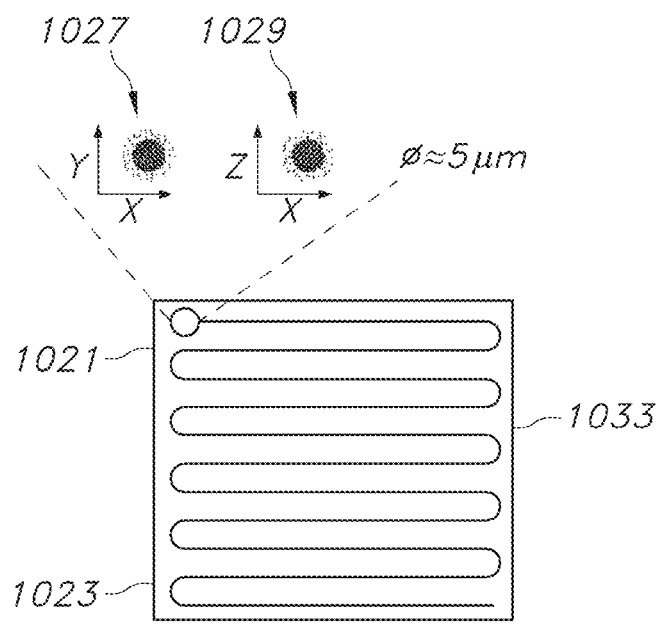
FIGS. 10A-10B illustrate scanning a focused spot for an optical pulse (whether a temporally multiplexed sub-pulse or not), according to an implementation.
Figure 10B:
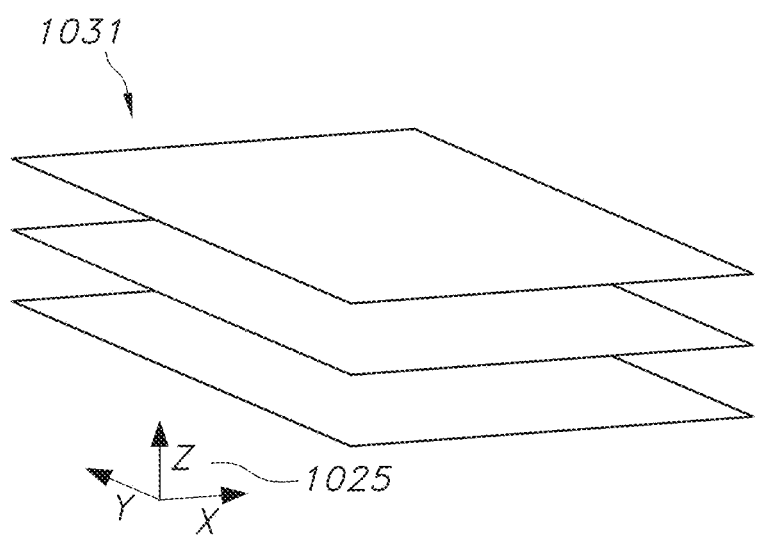

FIGS. 10A-10B illustrate scanning a focused spot for an optical pulse (whether a temporally multiplexed sub-pulse or not), according to an implementation. A small sized temporally focused spot 1021 can be scanned over the imaging field-of-view (FOV) 1023. The FOV 1023 can be a slice of sample 119, the image of which is captured by the imaging system 100. The penetration of optical pulses (whether a temporally multiplexed sub-pulses or not) into the depth of sample 119 can scan a stack 1031 of slices of sample 119. Each slice 1023 is similar to a Z-plane in FIGS. 7 to 9. The focused spot 1021 may be similar to spots 201, 203, 205, and 207 shown in FIG. 2 and FIG. 7. For example, the size of the temporally focused spot 1021 can be approximately 5 by 5 by 5 µm. Due to light sculpting, the excitation of sample 119 can be isotropically confined, hence providing single neuron optical sectioning capability in the axial direction x, y, or z as shown by coordinate systems 1025, 1027, and 1029. Volume acquisition can be performed by axial scanning of the sample 119. The axial scanning can cause the excited fluorescence to be detected by a photomultiplier tube (PMT) 127 (shown in FIG. 1). As previously shown in FIG. 3, the scanning of slice 1023 of sample 119 by the temporally focused spot 1021 can be performed with a sinuous pattern 1033.

In some implementations, various modalities of widefield temporal focusing based microscopy can be established. A scanning variant of temporal focusing, aptly named scanned temporal focusing is described herein. The scanned temporal focusing can be combined with latest state-of-the-art fiber-based laser amplifiers as well as spatial and temporal multiplexing, to circumvent and optimize design in two-photon laser scanning microscopy. For example, by light-sculpting an excitation volume of 5 by 5 by 5 µm and rapidly scanning the excitation volume over the image FOV, plane acquisition speeds can dramatically be improved, without sacrificing single-neuron resolution. Matching the repetition rate (e.g., laser pulses per second) to the number of acquired voxels per second further provides optimal signal-to-noise ratios, as only a single laser pulse can be used to excite the sample during the image pixel acquisition, as shown in equation (1), whereby shot-noise is further minimized.

Figure 11:
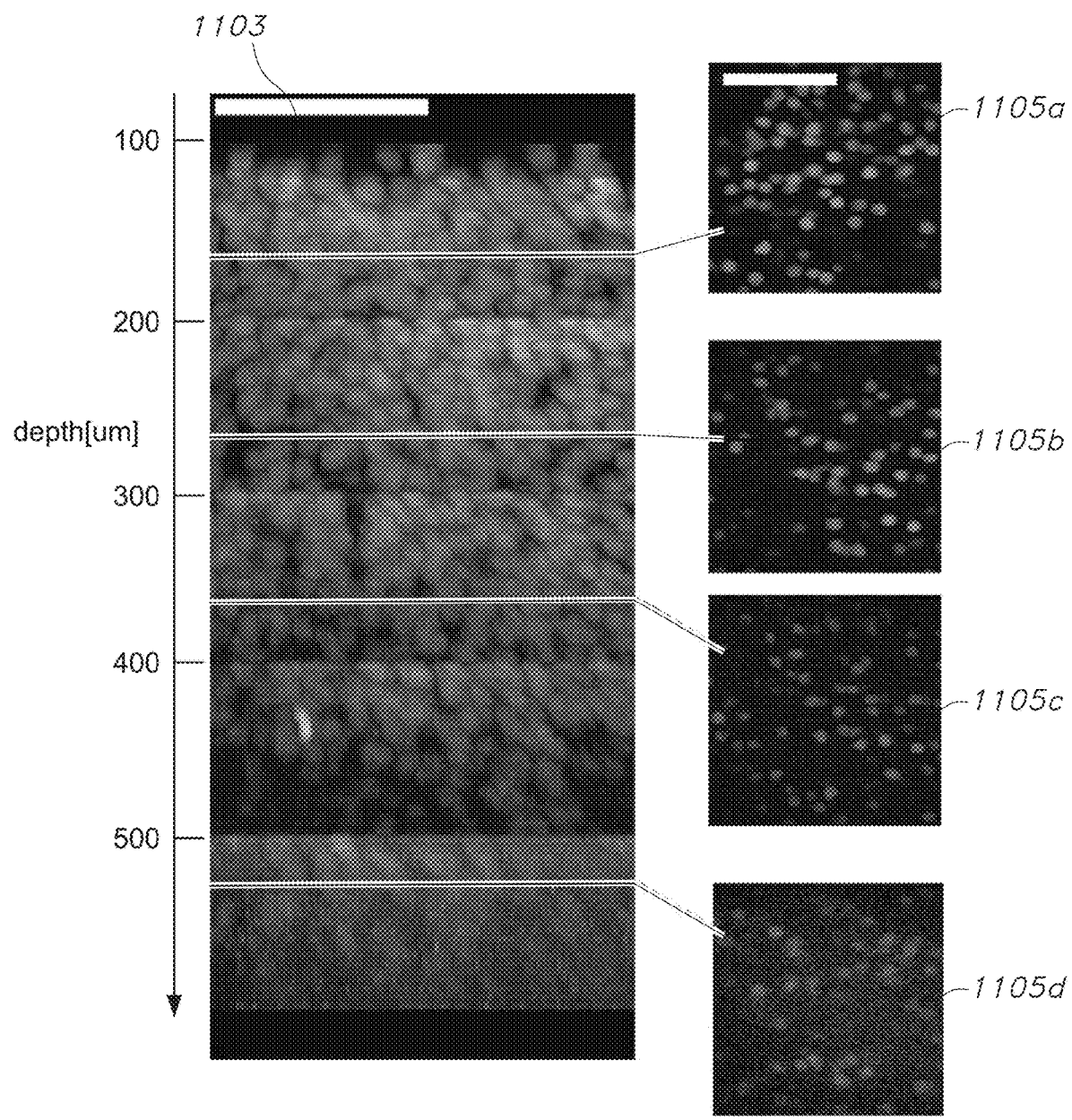
FIG. 11 illustrates in vivo volume stack acquisition in auditory cortex of mouse expressing nuclear-confined red fluorescent protein, according to an implementation.

FIG. 11 illustrates in vivo volume stack acquisition in auditory cortex of mouse expressing nuclear-confined red fluorescent protein, according to an implementation. The stack 1101 can be acquired with 5 µm spot scanned temporal focusing configuration and scanner 111 (e.g., galvanometric mirrors) as shown in FIG. 1. Average power of the laser module 139 can be between 25 and 50 mW, depending on the depth. Scale 1103 displays the depth from 100 µm to 600 µm. Images 1105a, 1105b, 1105c and 1105d are magnified images of stack 1101. Neuronal nuclei are clearly distinguishable, even at depth beyond 500 um, as shown in image 1105d.

Figure 12:
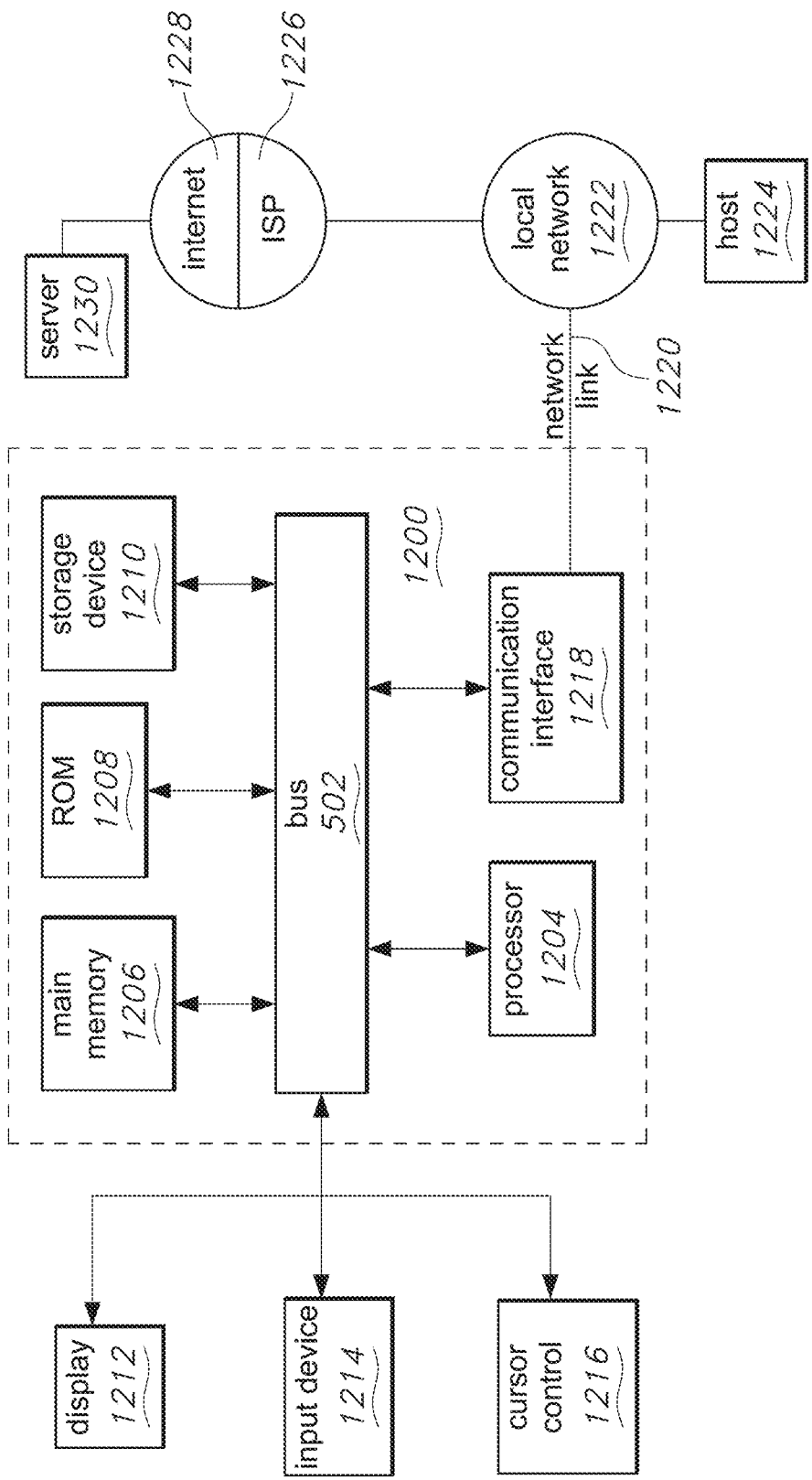
FIG. 12 is a block diagram that illustrates a computer system upon which aspects of this disclosure may be implemented.

FIG. 12 is a block diagram that illustrates a computer system 1200 upon which aspects of this disclosure may be implemented, such as, but not limited to, multi-channel counting card (dmCC) 129 and computing device 131. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Various other actions may be performed in response to identifying WLAN issues. In some situations, a replacement wireless router may be automatically dispatched to a customer in response to detecting a bad wireless router. In some situations, a customer may be automatically notified (through, for example, emails and pop-up windows) about potential WLAN issues or potentially problematic devices that may be impacting service quality at a customer location. In some situations, a system may automatically recommend WLAN changes, such as upgrading a wireless router, upgrading a client device, suggesting moving or placement of a wireless router or client device, and suggesting use of wireless network repeaters. In some situations, information about WLAN conditions may be automatically included in a monthly bill or online account webpage. In some situations, network conditions of customers who contact customer support may be gathered in a database, and used to dynamically and/or automatically identify reasons for customer dissatisfaction; for example, wireless router models may be identified and assessed for compatibility with other network hardware and client devices, and information about CPE 132 (which includes an integrated wireless router) may be collected to improve quality over time.

Computer system 1200 may be coupled via bus 1202 to a display 1212, such as a cathode ray tube (CRT) or liquid crystal display (LCD), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Another type of user input device is a touchscreen, which generally combines display 1212 with hardware that registers touches upon display 1212.

This disclosure is related to the use of computer systems such as computer system 1200 for implementing the techniques described herein. In some examples, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 1200, various machine-readable media are involved, for example, in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

The separation of various components in the examples described above should not be understood as requiring such separation in all examples, and it should be understood that the described components and systems can generally be integrated together in a single package, or into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the technology to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An imaging system for temporally multiplexed scanned temporal focusing comprising:
   a laser module that outputs a laser pulse;
   an optical delay module that temporally multiplexes the laser pulse by splitting the laser pulse received from the laser module into a plurality of sub-pulses including at least a first sub-pulse and a second sub-pulse with a time delay between the first sub-pulse and the second sub-pulse based on a combination of a two-photon excitation scheme and a three-photon excitation scheme;
   a scanner that controls positioning of focus spots within a target volume by angularly deflecting the first and second sub-pulses;
   a spectral dispersion element that spatially disperses the first sub-pulse and the second sub-pulse into their respective spectral components to form a first dispersed sub-pulse and a second dispersed sub-pulse, respectively, with the spectral dispersion element being arranged in a conjugate plane to the target volume;
   a telescope that temporally focuses the spectral components of the first sub-pulse and the second sub-pulse, respectively, into the focus spots onto one or more planes in the target volume by imaging one or more spots illuminated on the spectral dispersion element by the first sub-pulse and the second sub-pulse onto the one or more planes in the target volume; and
   a photodetector that collects photons generated from the focus spots within the target volume upon excitation by the temporally focused spectral components of the first and second sub-pulses.

2. The imaging system as defined in claim 1, wherein the spectral dispersion element comprises a multiple element grating assembly that supports multiple gratings at different axial positions with respect to the telescope, the multiple gratings being configured to enable temporal focusing at different depths of the target volume.

3. The imaging system as defined in claim 1, wherein the one or more planes in the target volume are perpendicular to the conjugate plane associated with the spectral dispersion element imaging.

4. The imaging system as defined in claim 1, wherein the optical delay module further includes at least two optical paths for introducing the time delay between the first sub-pulse and the second sub-pulse via free-space propagation or via an optical fiber.

5. The imaging system as defined in claim 4, wherein the optical delay module further includes lenses or other diffractive components in the at least two optical paths for introducing different beam divergences for the first sub-pulse and the second sub-pulse.

6. The imaging system as defined in claim 1, further comprising a spatial multiplexing module configured to receive the first sub-pulse and the second sub-pulse from the optical delay module, the spatial multiplexing module including a beam splitter for splitting both the first sub-pulse and the second sub-pulse into a plurality of sub-beams including a first sub-beam and a second sub-beam, the first sub-beam and the second sub-beam of both the first sub-pulse and the second sub-pulse being spatially separated with respect to a first image plane formed at a first depth within the target volume and with respect to a second image plane formed at a second depth within the target volume.

7. The imaging system as defined in claim 6, wherein the imaging system is configured to achieve one laser pulse per pixel excitation.

8. The imaging system as defined in claim 1, wherein the spectral dispersion element is after the scanner and before the telescope.

9. An imaging system comprising:
   a laser module that outputs a laser pulse;
   an optical delay module that temporally multiplexes the laser pulse by splitting the laser pulse received from the laser module into a plurality of sub-pulses including at least a first sub-pulse and a second sub-pulse with a time delay between the first sub-pulse and the second sub-pulse based on a combination of a two-photon excitation scheme and a three-photon excitation scheme;
   a spectral dispersion element that disperses the first sub-pulse and the second sub-pulse into their respective spectral components to form a first dispersed sub-pulse and a second dispersed sub-pulse, respectively, the spectral dispersion element being arranged in a conjugate plane to a target volume;
   a telescope that temporally focuses the dispersed first sub-pulse and the dispersed second sub-pulse onto at least one plane in the target volume; and
   a photodetector that collects photons generated from focus spots within the target volume upon excitation by the temporally focused spectral components of the first and second sub-pulses.

10. The imaging system as defined in claim 9, further comprising a spatial multiplexing module including a beam splitter for splitting both the first sub-pulse and the second sub-pulse into a plurality of sub-beams including a first sub-beam and a second sub-beam, the first sub-beam and the second sub-beam of both the first sub-pulse and the second sub-pulse being spatially separated with respect to a first image plane formed at a first depth within the target volume and with respect to a second image plane formed at a second depth within the target volume.

11. The imaging system as defined in claim 10, wherein the imaging system is configured to achieve one laser pulse per pixel excitation, and wherein at least one plane in the target volume is perpendicular to the conjugate plane associated with the spectral dispersion element.

12. An imaging system comprising:
a laser module that outputs a temporally multiplexed laser pulse including at least a first sub-pulse and a second sub-pulse with a time delay between the first sub-pulse and the second sub-pulse based on a combination of a two-photon excitation scheme and a three-photon excitation scheme;
a scanner that controls positioning of focus spots within a target volume by angularly deflecting the first and second sub-pulses;
a spectral dispersion element that disperses the first sub-pulse and the second sub-pulse into their respective spectral components to form a first dispersed sub-pulse and a second dispersed sub-pulse, respectively, the spectral dispersion element being arranged in a conjugate plane to the target volume;
a telescope that temporally focuses the dispersed first sub-pulse and the dispersed second sub-pulse onto at least one plane in the target volume to achieve temporal focusing; and
a photodetector that collects photons generated from the focus spots within the target volume upon excitation by the temporally focused spectral components of the first and second sub-pulses.

13. The imaging system as defined in claim 12, wherein operations of scanning and temporal focusing are performed in an order of scanning and then temporal focusing.

14. The imaging system as defined in claim 12, wherein operations of scanning and temporal focusing are performed in an order of temporal focusing and then scanning.

15. The imaging system as defined in claim 12, further comprising a spatial multiplexing module, the spatial multiplexing module including a beam splitter for splitting both the first sub-pulse and the second sub-pulse into a plurality of sub-beams including a first sub-beam and a second sub-beam, the first sub-beam and the second sub-beam of both the first sub-pulse and the second sub-pulse being spatially separated with respect to a first image plane formed at a first depth within the target volume and with respect to a second image plane formed at a second depth within the target volume.

16. The imaging system as defined in claim 15, wherein the spatial multiplexing module is configured to achieve one laser pulse per pixel excitation, and wherein at least one plane in the target volume is perpendicular to the conjugate plane associated with the spectral dispersion element.

* * * * *